United States Patent
Mori et al.

(10) Patent No.: US 8,441,905 B2
(45) Date of Patent: May 14, 2013

(54) OPTICAL INFORMATION RECORDING MEDIUM AND OPTICAL INFORMATION PROCESSING APPARATUS

(75) Inventors: Go Mori, Osaka (JP); Hirohisa Yamada, Osaka (JP); Masaki Yamamoto, Osaka (JP); Yasuhiro Harada, Osaka (JP); Hideharu Tajima, Osaka (JP); Shigemi Maeda, Osaka (JP); Yoshiteru Murakami, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 35 days.

(21) Appl. No.: 12/801,489

(22) Filed: Jun. 11, 2010

(65) Prior Publication Data

US 2010/0254246 A1    Oct. 7, 2010

Related U.S. Application Data

(62) Division of application No. 12/451,006, filed as application No. PCT/JP2008/060056 on May 30, 2008.

(30) Foreign Application Priority Data

Jun. 1, 2007 (JP) ................. 2007-147462
Oct. 18, 2007 (JP) ................. 2007-271698

(51) Int. Cl.
*G11B 7/00* (2006.01)
(52) U.S. Cl.
USPC ..................................... 369/59.22
(58) Field of Classification Search .......... None
See application file for complete search history.

(56) References Cited

U.S. PATENT DOCUMENTS 5,543,978 A    8/1996   Park
5,699,342 A    12/1997  Yagi et al.
(Continued)

FOREIGN PATENT DOCUMENTS

EP    1 365 402 A2    11/2003
EP    1 467 367 A2    10/2004
(Continued)

OTHER PUBLICATIONS

Office Action from co-pending U.S. Appl. No. 12/801,487, dated May 26, 2011.

(Continued)

*Primary Examiner* — Joseph Haley
(74) *Attorney, Agent, or Firm* — Edwards Wildman Palmer LLP; David G. Conlin; Edmund J. Kouadakjian

(57) ABSTRACT

This invention allows super-resolution reproduction with which a better bER value is attainable, when information is recorded by a random pattern including a mark length not longer than a resolution limit, by use of a highly versatile signal decoding method.
Information is recorded as marks and spaces coded by RLL (1,7) modulation, which each of the marks and spaces have one of a plurality of lengths, and 2T marks and 2T spaces of the marks and spaces being formed are shorter than 0.12 μm. An information recording layer (20) includes a reproduction film (21) and a reflective film (22) which are provided in this order from a side from which reproducing light is incident, which reproduction film is made of (i) zinc oxide, (ii) strontium titanate, (iii) titanium oxide, (iv) cerium oxide, or (v) a material including at least one of the (i) through (iv), and which reflective film is made of tantalum or titanium.

1 Claim, 7 Drawing Sheets

U.S. PATENT DOCUMENTS

| | | |
|---|---|---|
| 6,198,587 B1 | 3/2001 | Hayashi |
| 6,524,766 B1 | 2/2003 | Ariyoshi et al. |
| 6,965,556 B1 | 11/2005 | Kikukawa et al. |
| 7,830,766 B2 | 11/2010 | Kasahara |
| 2002/0191527 A1 | 12/2002 | Kikukawa et al. |
| 2003/0198165 A1 | 10/2003 | Mouri et al. |
| 2004/0063032 A1 | 4/2004 | Yamamoto et al. |
| 2004/0168075 A1 | 8/2004 | Suh et al. |
| 2005/0063275 A1 | 3/2005 | Yamamoto et al. |
| 2005/0117507 A1 | 6/2005 | Hwang et al. |
| 2005/0213479 A1 | 9/2005 | Takamori et al. |
| 2005/0237912 A1 | 10/2005 | Kikukawa et al. |
| 2006/0072434 A1 | 4/2006 | Shintani et al. |
| 2006/0176947 A1 | 8/2006 | Lim |
| 2006/0203696 A1 | 9/2006 | Mori et al. |
| 2007/0030786 A1 | 2/2007 | Jansen et al. |
| 2007/0070843 A1 | 3/2007 | Kobayashi |
| 2007/0237059 A1 | 10/2007 | Kasahara |
| 2007/0247988 A1 | 10/2007 | Kikukawa et al. |
| 2008/0025190 A1 | 1/2008 | Yokoi et al. |
| 2009/0135711 A1 | 5/2009 | Kikukawa et al. |

FOREIGN PATENT DOCUMENTS

| | | |
|---|---|---|
| EP | 1 640 977 A1 | 3/2006 |
| EP | 1 835 501 A2 | 9/2007 |
| JP | 7-225952 | 8/1995 |
| JP | 8-147891 | 6/1996 |
| JP | 08-147891 | 6/1996 |
| JP | 10-074366 | 3/1998 |
| JP | 11-339306 | 12/1999 |
| JP | 2001-084643 | 3/2001 |
| JP | 2001-250274 | 9/2001 |
| JP | 2002-150611 A | 5/2002 |
| JP | 2003-006872 | 1/2003 |
| JP | 2005-302275 | 10/2005 |
| JP | 2007-012146 A | 1/2007 |
| JP | 2007-501991 | 2/2007 |
| JP | 2007-280551 | 10/2007 |
| JP | 2008-033985 | 2/2008 |

OTHER PUBLICATIONS

Office Action from co-pending U.S. Appl. No. 12/451,006 dated Jun. 17, 2011.

Office Action from co-pending U.S. Appl. No. 12/801,488 dated Jun. 21, 2011.

Kim et al., "Bit Error Rate Characteristics of Write once Read Many Super-Resolution Near Field Structure Disk," Japanese Journal of Applied Physics, vol. 45, No. 2B, 2006, pp. 1370-1373.

"Development of Reproduction Signal Error Reduction Technique for attainment of Next Generation Mass Storage and High Density Optical Discs," Hitachi Ltd., [online], May 22, 2007, News Release, [searched May 30, 2007], Internet <http://www.hitachi.co.jp/News/cnews/month/2007/05/0522b.html>.

"Next Generation Optical Disc Anatomical Textbook paperback edition," Nikkei BP, issued on Oct. 7, 2003, p. 109.

Minemura et al., "Novel Signal Processing Method for Super-Resolutiion," 2007 Optical Society of America.

International Search Report dated Aug. 19, 2008 issued in PCT/JP2008/060056.

International Search Report dated Dec. 20, 2010, corresponding to European Patent Application No. 08764924.0.

Kim et al., "Random Pattern Signal Characteristics of Super-RENS Disk in Blue Laser System", Proc. of SPIE vol. 5380, 2004, SPIE, Bellingham, WA, XP002609200, pp. 336-341.

Office Action from co-pending U.S. Appl. No. 12/801,485 dated May 18, 2011.

Office Action from co-pending U.S. Appl. No. 12/801,486 dated May 9, 2011.

Office Action from co-pending U.S. Appl. No. 12/451,006 dated Jan. 21, 2011.

Search report for corresponding European patent application No. 10006071.4 dated Nov. 23, 2010.

Search report for corresponding European patent application No. 10006073.0 dated Nov. 23, 2010.

Search report for corresponding European patent application No. 10006072.2 dated Nov. 23, 2010.

Search report for corresponding European patent application No. 10006069.8 dated Nov. 23, 2010.

Search report for corresponding European patent application No. 10006068.0 dated Nov. 23, 2010.

Yamamoto et al., "Read power sensitivity in energy-gap-induced super-resolution read only memory disc with Germanium Reflective Film", Japenese Journal of Applied Physics, vol. 46, No. 1, 2007. pp. 235-237.

Office Action dated Nov. 3, 2011 from co-pending U.S. Appl. No. 12/451,006.

Office Action dated Nov. 7, 2011 from co-pending U.S. Appl. No. 12/801,488.

Office Action dated Nov. 16, 2011 from co-pending U.S. Appl. No. 12/801,487.

Office Action dated Nov. 3, 2011 from co-pending U.S. Appl. No. 12/801,485.

Tajima et al., "Bit-Error-Rate-Based Evaluation of Energy-Gap-Induced Super-Resolution Read-Only-Memory Disc in Blu-ray Disc Optics", *Japanese Journal of Applied Physics*, vol. 47, Nov. 7, 2008, pp. 6013-6015.

Mori et al., "Energy-Gap-Induced Super-Resolution (EG-SR) Optical Disc Using ZnO Interference Film", *Japanese Journal of Applied Physics*, vol. 44, No. 5B, 2005, pp. 3627-3630.

Takamori et al., "Dual-Layer Energy-Gap-Induced Super-Resolution Read-Only-Memory Disc Using Zno Film", *Japanese Journal of Applied Physics*, vol. 45., No. 2B, 2006, pp. 1366-1369.

Yamamoto et al., "Super-Resolution Optical Disc with High Readout Stability Using a Zinc Oxide Thin Film", *Japanese Journal of Applied Physics*, vol. 43, No. 7B, 2004, pp. 4959-4963.

Kikukawa et al., "High-Density Read-Only Memory Disc with Super Resolution Reflective Layer", *Japanese Journal of Applied Physics*, vol. 40 (2001) pp. 1624-1628, Part 1, No. 3B, Mar. 2001.

Office Action (mailed Oct. 12, 2011) issued in co-pending U.S. Appl. No. 12/801,486.

Office Action (dated Nov. 9, 2012) issued in co-pending U.S. Appl. No. 12/801,487.

Office Action (dated Nov. 20, 2012) issued in co-pending U.S. Appl. No. 12/801,485.

Office Action (dated Nov. 16, 2012) issued in co-pending U.S. Appl. No. 13/456,089.

Office Action (dated Oct. 5, 2012) issued in co-pending U.S. Appl. No. 12/801,488.

OPTICAL INFORMATION RECORDING MEDIUM AND OPTICAL INFORMATION PROCESSING APPARATUS

This application is a Division of U.S. application Ser. No. 12/451,006, filed Oct. 22, 2009, which is a U.S. National Stage Application of PCT/JP2008/060056, filed May 30, 2008, the entire contents of which are hereby incorporated by reference.

TECHNICAL FIELD

The present invention relates to an optical information recording medium capable of optically recording and reproducing information, and an optical information processing apparatus for reproducing the information recorded on such an optical information recording medium.

BACKGROUND ART

There has conventionally been a high demand for optical information recording mediums to have high density and large capacity, due to the development in information communication technology and multimedia technology as well as the highly information-based trend. However, an upper limit of the recording density in an optical information recording medium is limited generally by a spot diameter of an optical beam that records or reproduces information. This is because a reduction in length of a recording mark diameter so as to attain high density in the optical information recording medium causes a spot region to include a plurality of marks, thereby causing difficulty in separately detecting the marks. The spot diameter of the optical beam is substantially represented by $\lambda/NA$, where a wavelength of a light source is $\lambda$, and a numerical aperture of the objective lens for forming an optical spot is NA. Therefore, it has been believed that a recording density of an optical information recording medium is improvable by reducing the spot diameter of the optical beam, which is reduced by shortening a length of a wavelength $\lambda$ of the light source and increasing the numerical aperture NA of the objective lens.

However, since (i) a wavelength of an ultraviolet region is thought to be a limit of a wavelength $\lambda$ of a light source in view of absorption of optical elements and sensitivity properties of a detector of a reproducing apparatus for reproducing the optical information recording medium, and (ii) the increase in numerical aperture NA of an objective lens in a reproducing apparatus for an optical information recording medium is substantially limited due to an allowed amount of tilt to the optical information recording medium, improvement in the recording density of an optical information recording medium by reducing a spot diameter of an optical beam is limited.

In recent years, development of an optical information recording medium that uses a super-resolution reproduction technique has been advancing. The super-resolution reproduction technique is a technique capable of reproducing a mark length not longer than a resolution limit (optical resolving power determined by a diffraction limit of reproducing light) of a reproducing optical system (optical system of a reproducing apparatus for reproducing an optical information recording medium). Use of such a super-resolution reproduction technique makes it possible to reproduce a mark length not longer than a resolution limit of the reproducing optical system. Thus, recording to the optical information recording medium by using a shorter mark length is possible. That is to say, it is substantially possible to increase a recording density of the optical information recording medium by use of the foregoing super-resolution reproduction technique. Hereinafter, an optical information recording medium which utilizes the foregoing technique is called a super-resolution reproducing medium, and reproduction which reproduces, by use of the foregoing technique, a recording pit of a mark length not longer than the resolution limit of an reproducing optical system is called super-resolution reproduction.

A resolution limit of a reproducing optical system, which is restricted by a frequency limit of a detectable signal, is generally said to be around $\lambda/(2NA)$ ($\lambda$: reproducing light wavelength; NA: aperture ratio of lens). However, this $\lambda/(2NA)$ is equivalent to a resolution limit of a period size of a pattern made by a repetition of a single-sized recording mark and a single-sized space, and $\lambda/(4NA)$, which is half of the $\lambda/(2NA)$, is known as a resolution limit of a recording mark length. Thus, hereinafter, a resolution limit denotes a resolution limit of a length of a recording mark, and such a resolution limit is $\lambda/(4NA)$. Practically, the resolution limit is effected by other elements in the optical system other than theory, therefore the resolution limit value may differ from a theoretical value calculated from a wavelength and a numerical aperture.

As an example of a technique which is capable of carrying out the aforementioned "super-resolution reproduction" which exceeds the resolution limit, Patent Literature 1 discloses an optical information recording medium capable of carrying out super-resolution reproduction by providing a functional layer on an uneven information recording surface, which functional layer improves spatial resolving power and is made of a simplex, an alloy, or a compound of metal, semiconductor material or like material (however, a specific reproduction principle of such an optical information recording medium is unknown). The optical information recording medium disclosed in Patent Literature 1 employs a method which disposes an identically-shaped mark not longer than the resolution limit in a direction of signal reproduction. More specifically, a single frequency repetitive phase pit (mark space ratio 1:1) is reproduced, so as to evaluate the system based on a CNR (carrier-to-noise ratio). The evaluation resulted in that a recording density was improved, thereby making super-resolution reproduction possible. The aforementioned pit pattern is hereinafter called a monotone pattern.

On the other hand, a mark edge recording system is generally employed as means for attaining high density of an optical information recording medium in view of, signal processing. A mark edge recording system is a system in which high density is attained in an optical information recording medium by using both ends of one recording mark as signals. In this system, a shortest pre-pit which has a shortest mark length in a reproduction beam scanning direction and pre-pits in several lengths based on the shortest length are specified by standards, and the pre-pits of different lengths are disposed in order in a direction of signal reproduction, following a rule specified by the standards. The aforementioned pit patterns are hereinafter called random patterns.

There are many practically used examples of the mark edge recording system that use a random pattern. For example, in case of a CD (Compact Disc), an EFM (8/14) (Eight to Fourteen Modulation) is employed as a modulation system. For other mediums such as a DVD (Digital Versatile Disk), BD (Blu-ray Disc), and HD DVD (High-Definition Digital Versatile Disk), the modulation system for each of these mediums are different from that of the CD: the DVD employs EFM Plus (8/16); the BD employs RLL (1,7); and the HD DVD employs ETM (8/12) (Eight to Twelve Modulation).

That is to say, with many of the optical information recording mediums, a mark edge recording system using a random pattern is employed. This is because, recording with use of the mark edge recording system of random patterns allows recording of information with higher density as compared to recording with use of a monotone pattern. Consequently, in order to apply the recording medium into practical use, there is the need to evaluate the optical information recording medium that uses the random pattern. An index of the evaluation may be, for example, a bER (Bit Error Rate). The bER is also called a bit error rate, and is a ratio of an error bit number Ne with respect to a whole decoded bit number Nt. The error bit number Ne is included in a decoded result of a signal which is attained as a result of reproducing a random pattern recorded in the optical information recording medium. The ratio is represented by an equation of bER=Ne/Nt.

Reproduction of an optical information recording medium recorded in high density by the mark edge recording system that uses random pattern uses a PRML (Partial Response Maximum Likelihood) decoding. Conventional optical information recording mediums generally uses peak detect as a signal detection method, however the PRML decoding is practically essential for the recent high density optical information recording mediums such as BD and HD DVD, and therefore is generally used.

An example of the PRML is PR(12221)ML used for the HD DVD. Moreover, for example, Non Patent Literature 1 discloses a signal decoding method of a super-resolution reproducing method called Super-RENS, for improving a bER property of a random pattern super-resolution reproduction. More specifically, Non Patent Literature 1 discloses a signal processing which is an advancement to the PRML signal decoding method for improving a bER property of super-resolution reproduction of random pattern.

CITATION LIST

Patent Literature 1
Japanese Patent Application Publication, Tokukai, No. 2001-250274 A (Publication Date: Sep. 14, 2001)
Non Patent Literature 1
"Bit Error Rate Characteristic of Write Once Read Many Super-Resolution Near Field Structure Disk" Japanese Journal of Applied Physics Vol. 45, No. 2B, 2006, pp. 1370-1373
Non Patent Literature 2
"Development of Reproduction Signal Error Reduction Technique for attainment of Next Generation Mass Storage and High Density Optical Discs", Hitachi Ltd., [online], May 22, 2007, News Release, [searched May 30, 2007], Internet <http://www.hitachi.co.jp/News/cnews/month/2007/05/0522b.html>
Non Patent Literature 3
"Next Generation Optical Disc Anatomical Textbook paperback edition", Nikkei B P, issued on Oct. 7, 2003, p 109

SUMMARY OF INVENTION

However, with the optical information recording medium disclosed in Patent Literature 1, evaluation of a reproduction signal quality is not carried out in a case where information is recorded by use of the random pattern. When information is recorded to the optical information recording medium disclosed in Patent Literature 1 by use of a random pattern including marks having a length not longer than a resolution limit, such a problem occurs that signal reproduction which attains a good bER value cannot be carried out by use of the generally-used PRML decoding method.

It is well known that occurrence of a remarkable signal error is a substantial problem unique to a conventional super-resolution reproduction, as also described in Non Patent Literature 2. Non Patent Literature 2 discloses a technique for reducing signal error rate at a time when super-resolution reproduction of a random pattern is carried out. The technique thus disclosed employs a new noise processing circuit technique that removes just a low frequency signal, which is distinctive to the conventional technique. Hence, such a reproduction cannot be carried out with a highly versatile decoding method and reproducing apparatus. In other words, this new technique lacks versatility.

Moreover, the signal processing disclosed in Non Patent Literature 1, although not clearly described, carries out reproduction by means of a new PRML signal decoding method that assumingly causes high costs and high electricity consumption. If this new PRML signal decoding method is not used, signal reproduction capable of attaining a good bER value cannot be carried out for information recorded as a random pattern that includes marks having a length not longer than a resolution limit. That is to say, it is not possible to carry out signal reproduction capable of attaining a good bER value by use of a generally-used PRML decoding method. Thus, this method lacks versatility.

As described above, with the conventional techniques, there has been the problem that signal reproduction capable of attaining a good bER value by use of a very versatile general PRML decoding method cannot be carried out for information recorded in a random pattern that includes marks having a length not longer than a resolution limit, which such mark length allows further high density recording.

The present invention is accomplished in view of the conventional problem, and its object is to provide an optical information recording medium and an optical information processing apparatus, each of which can carry out, by means of a highly versatile signal decoding method, a super-resolution reproduction that is capable of attaining a better bER value, in a case where information is recorded on a random pattern that includes marks having a length not longer than a resolution limit.

In order to attain the object, an optical information recording medium of the present invention includes: a substrate; an information recording layer; and a light-transmitting layer, the information recording layer and the light-transmitting layer being stacked on the substrate, said optical information recording medium being reproduced by use of reproducing light, having a wavelength of not less than 400 nm but not more than 410 nm, via an objective lens having a numerical aperture of not less than 0.84 but not more than 0.86, information being recorded on the information recording layer as marks and spaces coded by RLL(1,7) modulation, each of the marks and spaces having one of a plurality of lengths, and 2T marks and 2T spaces of the marks and spaces being formed to be shorter than 0.12 μm, and the information recording layer being made of at least one thin film, which allows a reproduction signal waveform, obtained by the reproducing light, to be (i) decoded in accordance with a PR(12221)ML decoding method, (ii) subjected to error-correction, and then (iii) reproduced.

According to the invention, a random pattern is decodable and reproducible with a relatively cheap conventional PR(12221)ML decoding method that is already installed in many non-super-resolution medium reproducing apparatuses. The random pattern is modulated to high density by RLL (1,7) modulation and has 2T marks and 2T spaces formed shorter than 0.12 μm. Such a length of the marks and spaces is a length not longer than an optical resolving power of an optical information recording medium, i.e., a resolution limit of a reproducing optical system. The optical resolving power is determined by a diffraction limit of the reproducing light. Note that the optical information recording medium includes an information recording layer and a light-transmitting layer stacked on a substrate, and is reproduced by use of reproducing light having a violet wavelength of not less than 400 nm but not more than 410 nm. The reproduction is carried out via an objective lens having a numerical aperture of not less than 0.84 to not more than 0.86.

The information recording layer of the present invention is arranged so as to be reproducible after error correction. Therefore, even if there is an error, a sufficient bER value for an error correction to be carried out is still attainable. That is to say, the present invention allows attainment of a better bER value. Further, the optical information recording medium can be practically used with high reliability, by being reproduced after error correction.

As a result, in a case where information is recorded by a random pattern including a mark length not longer than a resolution limit, super-resolution reproduction that can attain a better bER value can be carried out by use of a highly versatile signal decoding method.

Moreover, high quality decoding reproduction can be carried out by use of the PR(12221)ML decoding method that is already installed in many non-super-resolution medium reproducing apparatuses. Hence, super-resolution reproduction becomes possible just by changing a reproduction laser power to an appropriate value in a conventional non-super-resolution medium reproducing apparatus. That is to say, the present invention allows reproduction of both a super-resolution medium and a non-super-resolution medium.

In order to attain the above object, an optical information recording medium of the present invention includes: a substrate; and an information recording layer provided on the substrate, information being recorded on the information recording layer as marks and spaces by a predetermined modulation, each of the marks and spaces having one of a plurality of lengths, and shortest marks and shortest spaces of the marks and spaces being formed to be not longer than a resolution limit of a reproducing optical system, and the information recording layer including a reproduction film and a reflective film which are provided in this order from a side from which reproducing light is incident, the reproduction film being made of (i) zinc oxide, (ii) strontium titanate, (iii) titanium oxide, (iv) cerium oxide, or (v) a material including at least one of the (i) through (iv), and the reflective film being made of tantalum or titanium.

With an optical information recording medium of a random pattern system that includes a recording mark formed by use of a conventional super-resolution technique, which recording mark has a length not longer than an optical resolving power determined by a diffraction limit of a reproducing light (resolution limit of reproducing optical system), it is not always the case that a satisfiable bER value is attained, even if a C/N improves. Therefore, it is important to cause the bER value to decrease, so that a stable super-resolution reproduction is carried out.

The inventors found, for the first time, that with an information recording layer formed on a substrate that has a reproduction film (made of (i) zinc oxide, (ii) strontium titanate, (iii) titanium oxide, (iv) cerium oxide, or a material including at least one of the (i) through (iv)) and a reflective film (made of tantalum or titanium) provided in this order from a side from which reproducing light is incident, super-resolution reproduction with which a better bER value is attained can be carried out to recorded information (random pattern) recorded in accordance with a predetermined modulation as marks and spaces that have a plurality of lengths (see FIGS. 6 and 8).

In other words, in a case where information is recorded in a random pattern including a mark length not longer than a resolution limit, super-resolution reproduction that can attain a better bER value can be carried out by use of a highly versatile signal decoding method.

In the optical information recording medium of the invention, by having a reproducing light be incident on the optical information recording medium at the time of reproduction, the reflective film can absorb a part of the reproducing light so as to convert this light to heat in a part of a region in a reproduction beam spot, in order to increase a temperature of the reproduction film. This causes an optical constant (refractive index and/or attenuation coefficient) of the reproduction film in a wavelength of the reproducing light to change. As a result, a state of optical multiple beam interference of the region changes. Thus, it is considered that super-resolution reproduction is possible.

Moreover, according to the invention, the reproduction film and the reflective film are provided separately, and the reflective film and the reproduction film have separately allotted functions of (i) absorbing light and generating heat and (ii) changing optical characteristics, respectively. Therefore, there is no need for the reproduction film itself to solely accomplish the super-resolution reproduction by absorbing light and generating heat, then changing the optical characteristics. Therefore, carrying out of the super-resolution reproduction becomes possible without giving much burden on the reproduction film. This allows improvement in durability of the reproduction film. Moreover, since the reflective film and the reproduction film are separately allotted with the functions of (i) absorbing light and generating heat and (ii) changing optical characteristics, respectively, it is possible to reduce a functional requirement of the reproduction film, thereby allowing more freedom in material design of the reproduction film.

In order to attain the object, an optical information recording medium of the present invention includes: a substrate; an information recording layer; and a light-transmitting layer, the information recording layer and the light-transmitting layer being stacked on the substrate, the optical information recording medium being reproduced by use of reproducing light, having a wavelength of not less than 400 nm but not more than 410 nm, via an objective lens having a numerical aperture of not less than 0.84 but not more than 0.86, information being recorded on the information recording layer as marks and spaces coded by RLL(1,7) modulation, each of the marks and spaces having one of a plurality of lengths, and 2T marks and 2T spaces of the marks and spaces being formed to be shorter than 0.12 μm, and the information recording layer including a reproduction film and a reflective film which are provided in this order from a side from which reproducing light is incident, the reproduction film being made of (i) zinc oxide, (ii) strontium titanate, (iii) titanium oxide, (iv) cerium oxide, or (v) a material including at least one of the (i) to (iv), and the reflective film being made of tantalum or titanium.

The inventors found, for the first time, that with an information recording layer formed on a substrate having a reproduction film (made of (i) zinc oxide, (ii) strontium titanate, (iii) titanium oxide, (iv) cerium oxide, or (v) a material including at least one of the (i) through (iv)) and a reflective film (made of tantalum or titanium) provided in this order from a side from which reproducing light is incident, super-resolution reproduction with which a better bER value is attained can be carried out to recorded information (random pattern) recorded in accordance with a predetermined modulation as marks and spaces that have a plurality of lengths (see FIGS. 6 and 8).

That is to say, it is possible to carry out super-resolution reproduction with which a better bER value is attained, by use of a highly versatile signal decoding method, in a case where information is recorded on an optical information recording medium by a random pattern that includes marks having a length not longer than a resolution limit, i.e., by a pattern in which 2T marks and 2T spaces are provided by RLL(1,7) modulation to be a length shorter than 0.12 μm, which optical information recording medium has an information recording layer and a light-transmitting layer stacked therein and is reproduced by use of reproducing light having a wavelength of not less than 400 nm but not more than 410 nm, via an objective lens having a numerical aperture of not less than 0.84 but not more than 0.86.

In the optical information recording medium of the invention, by having a reproducing light be incident on the optical information recording medium at the time of reproduction, the reflective film can absorb a part of the reproducing light to convert this light to heat in a part of a region in a reproduction beam spot, in order to increase a temperature of the reproduction film. This causes an optical constant (refractive index and/or attenuation coefficient) of the reproduction film in a wavelength of the reproduction film to change. As a result, a state of optical multiple beam interference of the region changes. Thus, it is considered that super-resolution reproduction is possible.

Moreover, according to the invention, the reproduction film and the reflective film are provided separately, and the reflective film and the reproduction film have separately allotted functions of (i) absorbing light and generating heat and (ii) changing optical characteristics, respectively. Therefore, there is no need for the reproduction film itself to solely accomplish the super-resolution reproduction by absorbing light and generating heat, then changing the optical characteristics. Hence, carrying out of the super-resolution reproduction becomes possible without giving much burden on the reproduction film. This improves durability of the reproduction film. Moreover, since the reflective film and the reproduction film are separately allotted with the functions of (i) absorbing light and generating heat and (ii) changing optical characteristics, respectively, it is possible to reduce a functional requirement of the reproduction film, thereby allowing more freedom in material design of the reproduction film.

As described above, in the optical information recording medium of the present invention, the information recording layer has information being recorded thereon as marks and spaces coded by RLL(1,7) modulation, each of the marks and spaces having one of a plurality of lengths, and 2T marks and 2T spaces of the marks and spaces are formed to be shorter than 0.12 μm, and the information recording layer being made of at least one thin film, which allows a reproduction signal waveform, obtained by the reproducing light, to be (i) decoded in accordance with a PR(12221)ML decoding method, (ii) subjected to error-correction, and then (iii) reproduced.

Moreover, as described above, in the optical information recording medium of the present invention, the information recording layer has information being recorded thereon as marks and spaces by a predetermined modulation, each of the marks and spaces having one of a plurality of lengths, and shortest marks and shortest spaces of the marks and spaces being formed to be not longer than a resolution limit of a reproducing optical system, and the information recording layer including a reproduction film and a reflective film which are provided in this order from a side from which reproducing light is incident, the reproduction film being made of (i) zinc oxide, (ii) strontium titanate, (iii) titanium oxide, (iv) cerium oxide, or (v) a material including at least one of the (i) through (iv), and the reflective film being made of tantalum or titanium.

Moreover, as described above, in the optical information recording medium of the present invention, the information recording layer has information being recorded thereon as marks and spaces coded by RLL(1,7) modulation, each of the marks and spaces having one of a plurality of lengths, and 2T marks and 2T spaces of the marks and spaces being formed to be shorter than 0.12 μm, and the information recording layer including a reproduction film and a reflective film which are provided in this order from a side from which reproducing light is incident, the reproduction film being made of (i) zinc oxide, (ii) strontium titanate, (iii) titanium oxide, (iv) cerium oxide, or (v) a material including at least one of the (i) through (iv), and the reflective film being made of tantalum or titanium.

Hence, it is possible to carry out super-resolution reproduction with which a better bER value is attained by use of a highly versatile signal decoding method, in a case where information is recorded by a random pattern that includes marks having a length not longer than a resolution limit.

REFERENCE SIGNS LIST

Figure 1:
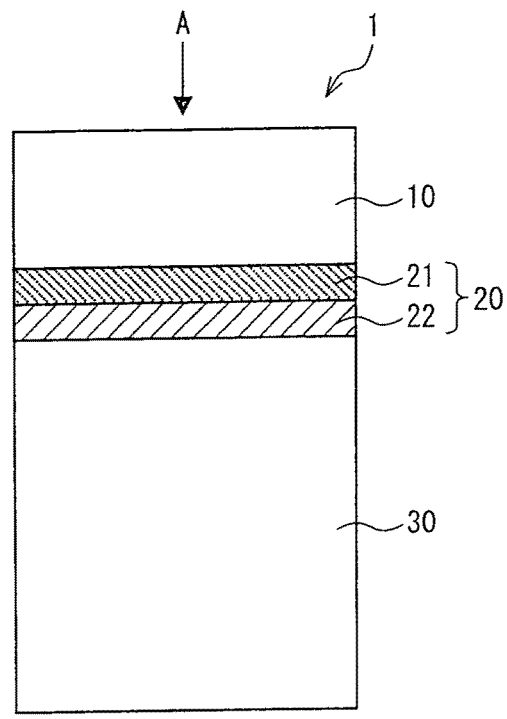
FIG. 1 is a cross-sectional view schematically illustrating an arrangement of an optical information recording medium in accordance with the present invention.

1 Optical information recording medium
2 Optical information recording medium
3 Optical information recording medium
4 Non-super-resolution optical information recording medium
10 Light-transmitting layer
20 Information recording layer
21 Reproduction film
22 Reflective film
30 Substrate
40 Information recording layer
41 Reproduction film
42 Reflective film
45 Information recording layer
100 Optical information recording medium reproducing apparatus (Optical information processing apparatus)
101 Spindle motor
102 Light pick-up device
103 Controller
104 Signal decoder

DESCRIPTION OF EMBODIMENTS

First Embodiment

One embodiment of the present invention is described below with reference to FIGS. 1 through 6. In the present embodiment, an arrangement is exemplified in which information is recorded on an information recording layer by forming pre-pits on the information recording layer, thereby causing the information recording layer to be uneven in level. The information recording layer may be arranged so as to record information by including a recording film made of phase change material. With the phase change material, phase change occurs between a crystalline state and a non-crystalline state due to irradiation of recording light.

First is a description explaining a schematic arrangement of an optical information recording medium (optical disk) 1 of the present embodiment, with reference to FIG. 1. FIG. 1 is an explanatory view illustrating a cross section of the optical information recording medium 1 of the present embodiment. As illustrated in FIG. 1, the optical information recording medium 1 includes a light-transmitting layer 10, an information recording layer 20, and a substrate 30. The light-transmitting layer 10, the information recording layer 20, and the substrate 30 are stacked in this order, from a side A from which light (reproducing light) is incident. The light-transmitting layer 10 is a layer that is generally called a cover layer in the BD (Blu-ray Disc) and the like.

The light-transmitting layer 10 is formed of transparent resin. The light-transmitting layer 10 is sufficient as long as reproducing light is sufficiently transmitted through, and may be formed of UV cured resin or the like. Examples of resin material that are usable for the light-transmitting layer 10 encompass: epoxy acrylate, urethane acrylate, polyester acrylate, fluorinated acrylic resin, and epoxy resin. Moreover, the light-transmitting layer 10 is not limited to a single-layer structure, and can be of a double-layer structure made of a transparent resin film (e.g., polycarbonate film) and a transparent sticky resin layer. Other than this, a hard coat layer may be provided on a light incident surface of the light-transmitting layer 10.

The light-transmitting layer 10 requires a thinness in such a manner that a tilt margin is sufficiently attained with respect to a coma abbreviation generated due to a tilt in relation with an optical axis of incident reproducing light, while requiring a thickness in such a manner as to sufficiently protect the information recording layer 20. The thickness of the light-transmitting layer 10 here denotes an average thickness of the light-transmitting layer 10 in an information region of the optical information recording medium 1, and the optical information recording medium 1 each has its inherent thickness. Moreover, the thickness of the light-transmitting layer 10 in a later-described reproducing optical system (optical system of an optical information recording medium reproducing apparatus 100 of Second Embodiment) is in a range of around 69 μm to 108 μm. In a case where the optical information recording medium 1 has one layer (hereinafter referred to as "single-layered") of the information recording layer 20, it is more preferable that the thickness is around 100 μm. On the other hand, when the light-transmitting layer 10 is applied to an optical information recording medium 1 having two layers (hereinafter referred to "double-layered") of the information recording layer 2, i.e., a double-layered optical information recording medium, the thickness of the light-transmitting layer 10 positioned on a side from which reproducing light is incident is preferably around 75 μm.

In practical use, a desired thickness of the light-transmitting layer 10 is effected by a refractive index of the light-transmitting layer 10. A general refractive index of the foregoing resin material used for the light-transmitting layer 10 is in a range of 1.45 to 1.70. When the refractive index is within this range, the desired thickness of the light-transmitting layer 10 is preferably in a range of around 93 μm to 108 μm for a single-layered optical information recording medium 1, and in a range of around 69 μm to 82 μm for a double-layered optical information recording medium 1. The thickness of the light-transmitting layer 10 is modifiable in design by correcting spherical aberration via adjustment of a beam expander or a collimator lens of a reproducing optical system. Hence, if the thickness of the light-transmitting layer 10 is at least between the lower limit of the double-layered thickness and the upper limit of the single-layered thickness, in other words within the range of 69 μm to 108 μm, reproduction is satisfactorily carried out by designing the light-transmitting layer 10 by adjustment of the spherical aberration of the reproducing optical system. The foregoing range of the thickness of the light-transmitting layer 10 is an allowable range of an average thickness of each separate optical information recording medium 1; the thickness is not a thickness that is allowed for the whole information region in the one optical information recording medium 1. In the one optical information recording medium 1, the thickness of the light-transmitting layer 10 is desirably within ±3 μm of an average value in the information region, in view of a general reproduction ability and a servo ability of a reproducing optical system when the medium is rotating.

In the present embodiment, light having a wavelength that corresponds to violet light (375 nm to 491 nm) is specifically used as the reproducing light in the present embodiment, and preferably, light having a wavelength of not less than 400 nm but not more than 410 nm is used. Moreover, an objective lens that has a numerical aperture of not less than 0.84 but not more than 0.86 is used.

Figure 2:
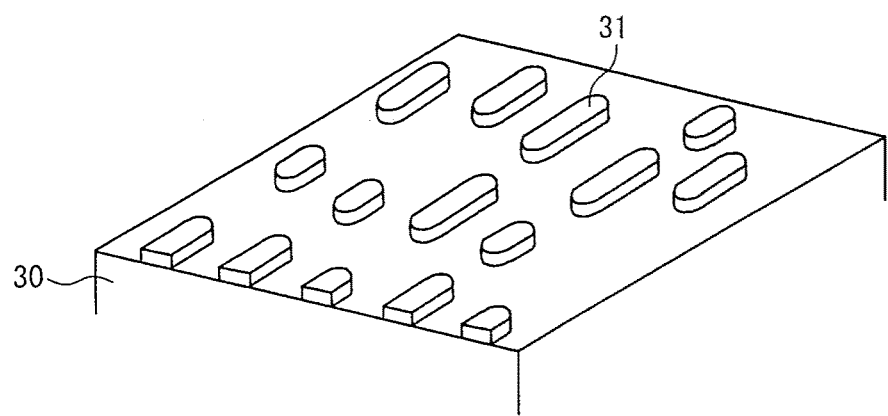
FIG. 2 is a perspective view schematically illustrating an arrangement of a pre-pit provided on a substrate that forms the optical information recording medium.

Next, the substrate 30, as illustrated in FIG. 2, is formed in such a manner that pre-pits (pits) 31 of an uneven level that correspond to recorded information are provided as a concentric circle or a spiral. An optical characteristic of a material constructing the substrate 30 is not particularly limited, and may be transparent or nontransparent. Examples of material constructing the substrate 30 encompass: glass, polycarbonate resin, other compressible resin, metal, and any combination thereof.

Pre-pits 31 are provided on a surface of the substrate 30 that is in contact with the information recording layer 20. The information recording layer 20 is provided on the surface on which the pre-pits 31 are provided, thereby causing the uneven level of the pre-pits 31 to be transferred to the information recording layer 20. As a result, in the optical information recording medium 1, the information recording layer 20 records information as an unevenly leveled surface, and is provided as a medium called a reproduction-only optical information recording medium.

The information recording layer 20 includes a reproduction film 21 and a reflective film 22. The reproduction film 21 and the reflective film 22 are stacked in the order of the reproduction film 21 and the reflective film 22 from a side A from which light (reproducing light) is incident, as illustrated in FIG. 1. That is to say, from the side A from which light (reproducing light) is incident, the light-transmitting layer 10, the reproduction film 21, the reflective film 22 and the substrate 30 are stacked in this order.

The reflective film 22 has mainly two functions. One is to absorb part of the reproducing light, and convert this absorbed light to heat for heating the reproduction film 21. The other function is to reflect the reproducing light, so that the reflected light can be used for signal reproduction.

Heating of the reproduction film 21 with the heat generated by the reflective film 22 causes an optical constant of the reproduction film 21 to change. Due to the change in the optical constant, the reproduction film 21 becomes capable of reproducing a mark (pit) having a length shorter than a resolution limit of reproducing optical system (optical resolving power determined by a diffraction limit of the reproducing light). More specifically, temperature increase of the reproduction film 21 causes a change in refractive index and/or extinction coefficient, which together causes a change in a state of optical multiple beam interference. The refractive index and extinction coefficient are optical constants of a wavelength of reproducing light. The function of the reproduction film 21 may be explained as in the following description, for example.

A reproducing beam spot formed by converging reproducing light is unbalanced in temperature distribution caused by light intensity distribution, between a center of the spot and a peripheral part of the spot. Since the reproduction beam spot scans the optical information recording medium 1 in practical use, the high temperature center slides to a rear side with respect to a progressing direction of the reproduction beam spot, thereby generating a temperature gradient in the reproduction beam spot. That is to say, a high temperature section generates at a rear side with respect to a progressing direction of the reproduction beam spot, and a low temperature section generates at a front side thereof. If the reproduction film 21 changes in refractive index depending on temperature, the high temperature section in which the temperature is increased by receiving the reproducing beam changes in refractive index of the reproduction film 21. Thus, by designing an optical interference structure of the information recording layer 20 in advance, it is possible, for example, to change the information recording layer 20 to a high reflectance state. On the other hand, in the low temperature section, the refractive index of the reproduction film 21 is maintained at its initial state. Therefore, the information recording layer 20 has a low reflectance as compared to the high temperature section. Active use of reflectance distribution of the information recording layer 20 in the reproduction beam spot allows substantially reducing a size of a reproduced region to a size smaller than the reproduction beam spot, thereby improving reproduction resolving power. This improvement in the reproduction resolving power allows carrying out of the super-resolution reproduction.

As from the above, the reproduction film 21 is preferably made of a metal oxide film that has a property in which an optional characteristic changes due to a band gap change caused by heat. This improves reproduction durability of the reproduction film 21, as compared to (i) a pigment in which an optical characteristic changes due to a regular structural change such as composition change or phase change, or (ii) a reproduction film in a super-resolution reproduction optical information recording medium of a type which uses a phase-changing material. Moreover, many of metal oxide films are transparent, and have good transmitting characteristics to the reflective film 22, thereby allowing the reflective film 22 to function more efficiently.

Moreover, of the metal oxide films, it is particularly preferable to apply zinc oxide as the reproduction film 21, which is relatively cheap and abundant. Thus, the reproduction film 21 is preferably made of zinc oxide, or preferably contains zinc oxide. The arrangement can reduce costs for the optical information recording medium 1. Moreover, by providing the reproduction film 21 made of zinc oxide or made of material containing zinc oxide, it is possible to attain a super-resolution characteristic higher than the other metal oxide films. This makes it possible to increase the recording capacity of the optical information recording medium 1. Furthermore, by using zinc oxide or the material containing zinc oxide, the reproduction film 21 is easily manufactured, thereby allowing bulk manufacture of the reproduction film 21. Further, deterioration with time unreadily occurs, which improves reproduction durability.

It is also possible to provide the reproduction film 21 by use of metal oxides other than zinc oxide, for example $TiO_2$ (titanium oxide), $CeO_2$ (serium oxide), or $SrTiO_3$ (strontium titanate), or any material which contains the metal oxides as its main component. In this case also, the same level of reproduction durability is attained as with the reproduction film 21 made of zinc oxide and the reproduction film 21 made of a material containing zinc oxide.

Moreover, a material of the reflective film 22 is preferably a material which (i) has a certain degree of reflectance, (ii) has a low thermal conductivity, and (iii) is stable, for example a metal such as titanium (Ti) or tantalum (Ta). Therefore, even if the reflective film absorbs a part of the reproducing light, the thermal conductivity is low, thereby causing only a relatively small amount of heat release in a film surface direction. Thus, it is possible to carry out heat conduction in a relatively efficient manner to the reproduction film 21 positioned in a film normal direction. On the other hand, materials such as Al or Ag that have been generally used as the reflective film in conventional optical information recording mediums have a high reflectance and a high thermal conductivity. Therefore, in a case where the conventional reflective film is used, the reproducing light cannot be sufficiently absorbed, which therefore results in attaining insufficient heat for the super-resolution reproduction of the present application. This results in a decrease in super-resolution reproduction power sensitivity. Moreover, when the conventional reflective film is used, the thermal conductivity is too high, thereby causing a great amount of heat release from the reflective film in a film surface direction. Consequently, thermal conduction efficiency towards the reproduction film 21 provided in the film normal direction drops. Because of this, a sufficient amount of heat for carrying out super-resolution reproduction of the present invention is not provided, thereby causing a decrease in super-resolution reproduction power sensitivity.

As described above, the optical information recording medium 1 of the present embodiment includes, in the information recording layer 20, (i) the reflective film 22 which absorbs a part of reproducing light to generate heat and (ii) the reproduction film 21 which causes an optical constant of a part thus heated to change due to heating by the reflective film 22. Moreover, in the optical information recording medium 1 of the present embodiment upon reproduction of information recorded in the information recording layer 20, the reproducing light is irradiated through the light-transmitting layer 10 and is converged to the information recording layer 20. Accordingly, in the information recording layer 20, the reflective film 22 absorbs the reproducing light so as to convert the light the heat, and transmits the heat thus converted to the reproduction film 21. Note that the optical information recording medium 1 rotates upon reproduction due to the optical information recording medium reproducing apparatus; the temperature in the rear end part of the beam spot therefore increases due to an unbalanced temperature distribution caused by the light intensity distribution and the medium rotation, as described in the description of the reproduction film 21. In other words, the position that has the high temperature moves off the center of the spot. By having the position with the high temperature off the center of the spot, transmittance of the reproduction film 21 in the high temperature region changes, which as a result makes it possible to read out information recorded with a mark (pit) having a length not longer than the resolution limit of the information recording layer 20. As a result, a substantial recording density (a reproducible recording density) of the information recording layer 20 is increased so as to be higher than the recording density limited by the resolution limit. Other than this, it is no more necessary to provide a plurality of layers for improving recording density, thereby is possible to increase recording density while remarkably reducing manufacturing costs for the recording medium.

Furthermore, in the optical information recording medium 1, a reflective film 22 and a reproduction film 21 are separately provided and allotted to have functions of (i) absorbing light and generating heat and (ii) changing an optical property, respectively. Thus, there is no need for the reproduction film 21 itself to absorb light and generate heat, and further change an optical property, to accomplish super-resolution reproduction. This allows carrying out of the super-resolution reproduction without giving much burden to the reproduction film, thereby improving durability of the reproduction film 21. Moreover, since the reflective film 22 and the reproduction film 21 are allotted to the function of absorbing light and generating heat and to the function of changing an optical property, respectively, a functional requirement of the reproduction film 21 can be reduced, thereby increasing the freedom in material design.

The following description compares various properties of the optional information recording medium 1 of the present embodiment and a conventional optical information recording medium. First described is a comparison of various properties between Example 1 of the optical information recording medium 1 in the present embodiment and Comparative Examples 1 and 2 of a conventional optical information recording medium.

Example 1

The following description explains Example 1 of the optical information recording medium in the present embodiment. The optical information recording medium of Example 1 includes: as a light-transmitting layer 10, a polycarbonate film (film thickness: approximately 80 µm) and a transparent sticky resin layer (film thickness: approximately 20 µm); as an information recording layer 20, a reproduction film (film thickness: 60 nm) made of zinc oxide and a reflective film 22 (film thickness: 7 nm) made of tantalum (Ta); and as a substrate 30, a polyolefin-based resin substrate. Moreover, as illustrated in FIG. 1, the optical information recording medium 1 in Example 1 is of a stacked arrangement in which the light-transmitting layer 10, the information recording layer 20, and the substrate 30 are stacked in this order from a side A from which light (reproducing light) is incident. More specifically, the polycarbonate film, the transparent sticky resin layer, zinc oxide, tantalum (Ta), and the polyolefin-based resin are stacked in this order.

The film thickness of the reproduction film 21 and the reflective film 22 are optimized so that an ideal bER (Bit Error Rate) characteristic is attained under a measurement condition later described. Moreover, of the two layers which constitute the light-transmitting layer 10, i.e., the polycarbonate film and the transparent sticky resin layer, the transparent sticky resin layer provided between the polycarbonate film and the reproduction film 21 also serves to adhere the polycarbonate film and the reproduction film 21 together. The thickness of the light-transmitting layer 10 is in a range within 100±3 µm. The same applies to the light-transmitting layer 10 of Comparative Example 1, Comparative Example 2, Example 2, and Example 3.

The following method is one example of how the optical information recording medium 1 of Example 1 is manufactured. First, the reflective film 22 and the reproduction film 21 are formed by sputtering in this order on the substrate 30 which has pre-pits 31 provided thereon. Ultimately, the light-transmitting layer 10 (more specifically a stacked arrangement of a polycarbonate film and a transparent sticky resin layer) is adhered to the reproduction film 21. This manufactures the optical information recording medium 1. As targets of the sputtering, zinc oxide-sintered target having a purity 99.99% was used as the zinc oxide, and Ta target having a purity 99.99% was used as the tantalum. Each of the targets was formed into films by carrying out RF magnetron sputter and DC magnetron sputter, respectively.

Moreover, the pre-pits 31 of Example 1 are provided in a random pattern and a monotone pattern for evaluation.

The random pattern (a pattern including marks and spaces of a plurality of lengths provided by RLL (1,7) modulation; a pattern including marks and spaces of a plurality of lengths provided by a predetermined modulation (such as RLL(1,7) modulation or ETM (8/12) modulation)) is provided in conformity to the RLL (1,7) modulation which is the same as a BD standard. A shortest mark in the data region is 2T (mark length: 93 nm), and a longest mark is 8T. Moreover, a 2T pre-pit (93 nm) and a 2T space is sized not more than a resolution limit $(2\lambda/(4NA)=0.12$ µm) of a later-described evaluation optical system (optical system of a disk measurement device). With a regular optical information recording medium (optical information recording medium which does not have the super-resolution reproduction function, hereinafter referred to as "non-super-resolution medium"), a pattern in which a pit and a space are adjacent to each other, which pit and space have a size not more than the resolution limit of the foregoing evaluation optical system, cannot be detected by the foregoing evaluation optical system. Hence, it is impossible to reproduce such pre-pits and spaces. Note that in this random pattern, just the 2T is of a size not longer than the resolution limit of the evaluation optical system, and other pre-pits (3T, 4T, . . . 8T) are all of a size larger than the resolution limit of the foregoing evaluation.

A mark denotes a state in which a recoding mark is provided on the optical information recording medium 1 (more specifically the information recording layer 20), and a space denotes a state in which a recording mark is not provided. Moreover, T represents a time period of one standard clock cycle in a time axis of the signal wave. For example, a mark length of 2T denotes a recording region on which a recording mark equivalent to two standard clock cycles is formed.

Moreover, a monotone pattern is formed in such a way that 2T marks (mark length: 93 nm) and 2T spaces are alternately provided in a consecutive manner (2T monotone pattern) for CNR (carrier-to-noise ratio) measurement.

Comparative Example 1

Figure 3:
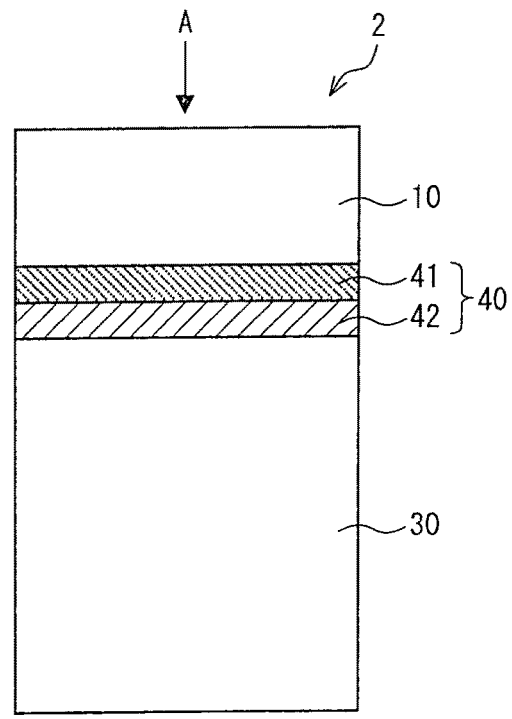
FIG. 3 is a cross-sectional view schematically illustrating an arrangement of an optical information recording medium of Comparative Example 1.

In comparison, FIG. 3 schematically illustrates a cross sectional arrangement of an optical information recording medium 2 as Comparative Example 1, with respect to the optical information recording medium 1 of Example 1. In Comparative Example 1, constituents which have identical functions as that in the optical information recording medium 1 of Example 1 are provided with identical reference signs, and explanations thereof are omitted.

As illustrated in FIG. 3, the optical information recording medium 2 of Comparative Example 1 includes: as the light-transmitting layer 10, a polycarbonate film (film thickness: approximately 80 μm) and a transparent sticky resin layer (film thickness: approximately 20 μm); as an information recording layer 40, a reproduction film 41 made of zinc oxide (film thickness: 78 nm) and a reflective film 42 (film thickness: 7 nm) made of silicon (Si); and as the substrate 30, a polyolefin-based resin substrate. The optical information recording medium 2 of Comparative Example 1 stacks the light-transmitting layer 10, the information recording layer 40, and the substrate 30 in this order from a side A from which light (reproducing light) is incident. More specifically, the optical information recording medium 2 stacks, in this order, a polycarbonate film, a transparent sticky resin layer, zinc oxide, silicon (Si), and a polyolefin-based resin.

The film thicknesses of the reproduction film 41 and the reflective film 42 are optimized so as to attain an ideal bER characteristic under a measurement condition later mentioned. Moreover, at this time, Comparative Example 1 demonstrated to have a substantially same reflectance as the reflectance of Example 1. Note that a same pattern formed on the pre-pits in Example 1 is used.

Comparative Example 2

Figure 4:
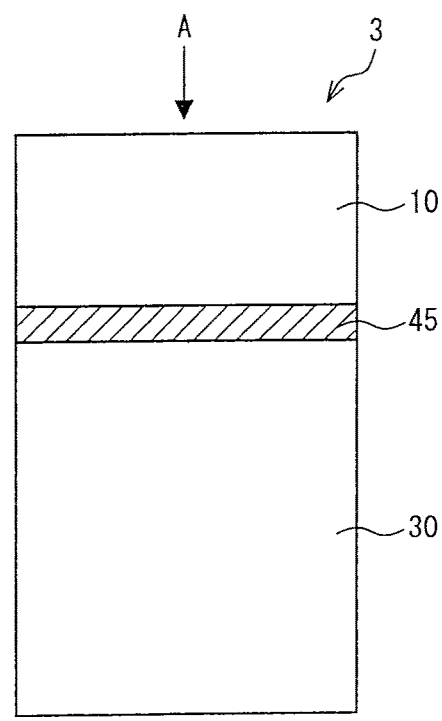
FIG. 4 is a cross-sectional view schematically illustrating an arrangement of an optical information recording medium of Comparative Example 2.

FIG. 4 schematically illustrates a cross-sectional arrangement of an optical information recording medium 3 as Comparative Example 2, with respect to the optical information recording medium 1 of Example 1. In Comparative Example 2 also, constituents which have identical functions as that of the optical information recording medium 1 of Example 1 are provided with identical reference signs, and explanations thereof are omitted. Moreover, the optical information recording medium 3 of Comparative Example 2 has an identical arrangement as an arrangement disclosed in Patent Literature 1, as a reproduction-only medium that is capable of super-resolution reproduction.

As illustrated in FIG. 4, the optical information recording medium 3 of Comparative Example 2 includes: as the light-transmitting layer 10, a polycarbonate film (film thickness: approximately 80 μm) and a transparent sticky resin layer (film thickness: approximately 20 μm); as an information recording layer 45, a layer (film thickness: 50 nm) made of silicon (Si); and as the substrate 30, a polyolefin-based resin substrate. Moreover, as illustrated in FIG. 4, the optical information recording medium 3 of Comparative Example 2 stacks the light-transmitting layer 10, the information recording layer 45, and the substrate 30 in this order from a side A from which light (reproducing light) is incident. More specifically, the optical information recording medium 3 stacks, in this order, a polycarbonate film, a transparent sticky resin layer, silicon (Si), and a polyolefin-based resin. Note that a pattern formed on the pre-pit is identical to that of Example 1.

Moreover, the information recording layer 40 of Comparative Example 1 and the information recording layer 45 of Comparative Example 2 are formed on the substrate 30 on a surface on which the pre-pits 31 are formed, where information is recorded. Therefore, as similar to the optical information recording medium 1 of Example 1, the recesses and projections of the pre-pits 31 are transferred to the information recording layer 40 of the optical information recording medium 2 of Comparative Example 1 and the information recording layer 45 of the optical information recording medium 3 of Comparative Example 2, respectively. In other words, the optical information recording medium 2 and the optical information recording medium 3 are formed as a reproduction-only optical information recording medium. A general BD has a single layer recording capacity of 25 GB on a 12 cm disk, and a length of a shortest mark 2T is 149 nm. Therefore, the pre-pits 31 are calculated to have a density of 40 GB when converted to a 12 cm disk, in a case where the same track pitch as the 25 GB medium is employed.

The following description explains how various properties of (i) the optical information recording medium 1 of Example 1, (ii) the optical information recording medium 2 of Comparative Example 1, and (iii) the optical information recording medium 3 of Comparative Example 2 were compared.

First, disk reproduction measurement was carried out by use of a disk measuring device (DDU 1000, manufactured by Pulstec Industrial Co., Ltd.) which has a semiconductor laser of a λ (wavelength) 405 nm and an optical system having an NA (aperture ratio) of 0.85. Further, for considering application of the optical information recording medium for practical use, data to be recorded was modulated and recorded as a random pattern. Thereafter, a super-resolution reproduction characteristic of the disk was measured. In the present embodiment, pre-pits 31 that were common to Example 1, Comparative Example 1, and Comparative Example 2 were used. Hence, by comparing a reproduction evaluation result between the foregoing random pattern and monotone pattern, a super-resolution reproduction characteristic of both mediums (between the optical information recording medium 1 of Example 1 and the optical information recording medium 2 of Comparative Example 1, or between the optical information recording medium 1 of Example 1 and the optical information recording medium 3 of Comparative Example 2) can be compared. Moreover, the disk reproduction measurement was carried out in a linear velocity of 3.1 m/s, and CNR and bER each served as a signal evaluation index. The disk reproduction measurement described here is to (i) rotate the optical information recording medium, (ii) irradiate reproducing light, (iii) detect a reflection light so as to attain a reproduction signal waveform, and (iv) analyze the signal.

The following description explains each signal evaluation index. With the CNR, a carrier-to-noise ratio of the foregoing 2T monotone pattern was measured, to study a super-resolution reproducing performance of the 2T monotone pattern of Example 1, Comparative Example 1, and Comparative Example 2. The higher the CNR value, the higher a signal quality of a 2T monotone pattern not longer than the resolution limit of the present evaluation optical system (optical system of the disk measuring device).

The bER is also called a bit error rate, which is a ratio of the error bit number Ne with respect to the whole decoded bit number Nt. The error bit number Ne is included in a decoding result of a signal that is attained as a result of reproducing the random pattern recorded in the optical information recording medium. Namely, bER=Ne/Nt. The bER is generally used as an evaluation index for random pattern signal quality in an optical information recording medium. An increase of the bER value denotes that an originally recorded data cannot be reproduced with high reliability. More specifically, an increase in the bER value indicates that a reproduction signal from the optical information recording medium is deteriorated in quality, thereby causing generation of noise and skipping for example.

In the present embodiment, a PR(12221)ML decoding was carried out to a signal waveform obtained by the disk measuring device, to determine the bER with use of a correct pattern. The PR(1221)ML decoding is known to be used for reproducing an optical information recording medium that is recorded in high density. Moreover, equating coefficients that have a smallest mean square error between an equalized waveform and a PR(12221)ML ideal waveform was used. A method for optimizing this equating coefficient is called a mean square error (LMS: Least Mean Square) algorithm, and is frequently used in PRML decoding.

In the present embodiment, the super-resolution reproduction characteristic of the random pattern was compared between Example 1, Comparative Example 1, and Comparative Example 2, from the bER thus obtained as in the foregoing description. The lower the bER, the higher the signal quality of the random pattern including a 2T signal not longer than the resolution limit of the evaluation optical system of the present embodiment. Generally, a threshold determined by an error correction method that is employed to an optical information recording medium reproducing apparatus is used for determining whether there is a problem in practical use with the obtained bER. In the present embodiment, 3E-4 is used as a threshold. 3E-4 is recited in Non Patent Literature 3 as a bit error rate at a time of reproduction that substantially has no problem. Hence, a bER of not more than 3E-4 can be said as one that has substantially no problem practically, since an error is correctable even if there was an error. In the following descriptions, the value of 3E-4 serves as a threshold of bER (hereinafter may be referred simply to "threshold" or "practical application threshold"), unless mentioned otherwise.

Figure 5:
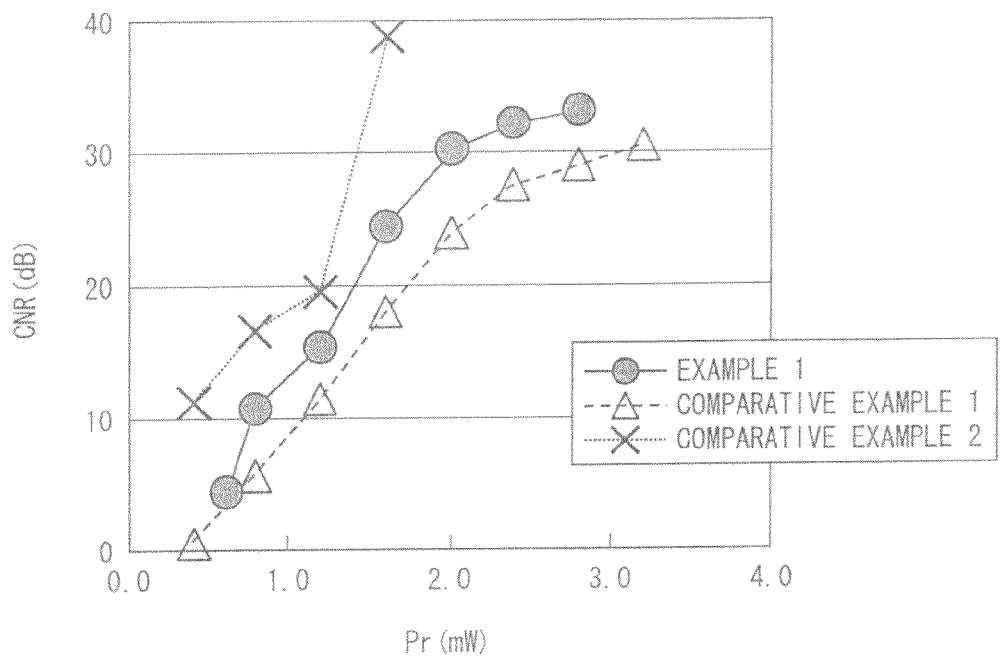
FIG. 5 is a characteristics diagram showing CNR reproduction power Pr dependencies of optical information recording mediums of Example 1, Comparative Example 1, and Comparative Example 2.
Figure 6:
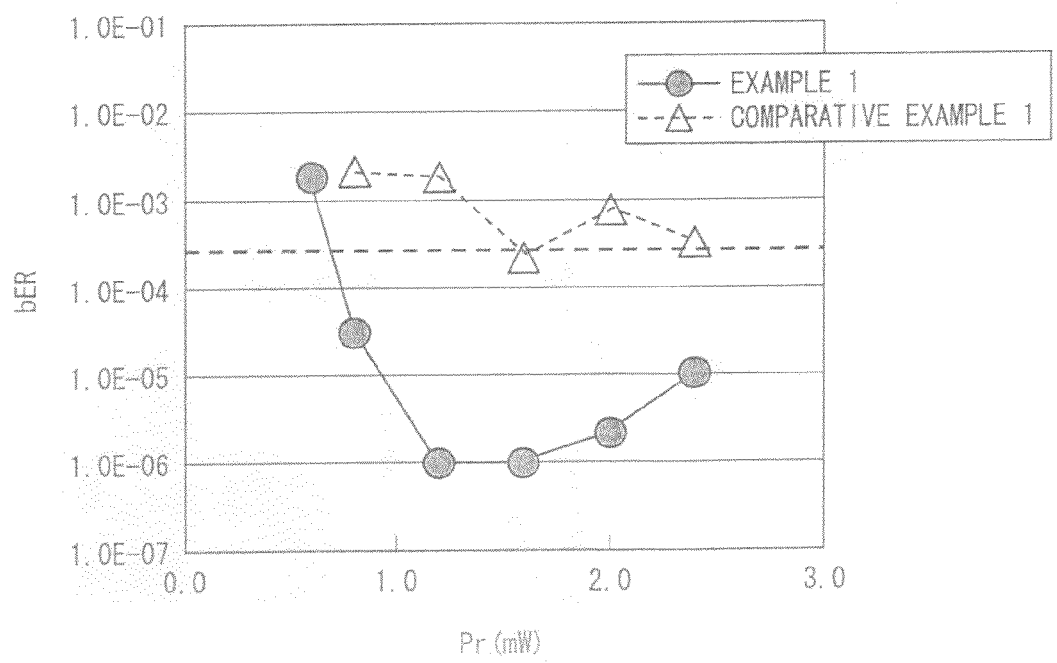
FIG. 6 is a characteristics diagram showing bER reproduction power Pr dependencies of optical information recording mediums of Example 1, Comparative Example 1, and Comparative Example 2.

The following description explains a comparison result of super-resolution reproduction characteristics of random patterns of Example 1, Comparative Example 1, and Comparative Example 2, with reference to FIGS. 5 and 6. FIG. 5 is a characteristics diagram showing CNR reproduction power Pr dependencies of the optical information recording mediums of Example 1, Comparative Example 1, and Comparative Example 2 (optical information recording medium 1, optical information recording medium 2, optical information recording medium 3). FIG. 6 is a characteristics diagram showing bER reproduction power Pr dependencies of the optical information recording mediums of Example 1, Comparative Example 1, and Comparative Example 2 (optical information recording medium 1, optical information recording medium 2, optical information recording medium 3).

First described is a measurement result of CNR reproduction power Pr dependencies of the optical information recording mediums of Example 1, Comparative Example 1, and Comparative Example 2 (optical information recording medium 1, optical information recording medium 2, optical information recording medium 3), measured by the disk measuring device. Each of the optical information recording mediums has the 2T monotone pattern.

As clear from the measurement result shown in FIG. 5, the CNR of the 2T monotone pattern increases as the reproduction power increases, in all of the optical information recording mediums of Example 1, Comparative Example 1, and Comparative Example 2. More specifically, the CNR is demonstrated to be not less than 10 dB around a reproduction power of 1.0 mW. An increase of the reproduction power causes a further increase in the CNR, in which all the optical information recording mediums (optical information recording medium 1, optical information recording medium 2, and optical information recording medium 3) demonstrate a CNR of not less than 30 dB, which 30 dB is a yardstick for practical use. This result exhibits that for all of Example 1, Comparative Example 1, and Comparative Example 2, a signal amplitude of the 2T monotone pattern increases as the reproduction power increases, thereby causing improvement in signal quality.

Next described is a measurement result of bER reproduction power Pr dependencies for the optical information recording mediums of Example 1 and Comparative Example 1 (optical information recording medium 1, optical information recording medium 2), measured by the foregoing disk measuring device. A result that exhibited poor signal quality and which resulted as insufficient measurement is not plotted in the characteristics diagram of FIG. 6. With Comparative Example 2, a clock could not be correctly generated; thereby the reproduction signal waveform could not be digitalized with correct sampling intervals. As a result, it was not possible to attain a sampling signal that could be bER evaluated. An internal clock method that uses a reproduction signal waveform was used for the clock generation. In other words, Comparative Example 2 had such a poor signal quality that the random pattern in this density could not be reproduced in a satisfactory manner.

As clear from the measurement result shown in FIG. 6, the optical information recording medium 1 of Example 1, at a reproduction power of not less than a predetermined reproduction power (in this case, 0.8 mW), exhibits a lower bER value as compared to the optical information recording medium 2 having a same reproduction power. Further, a super-resolution reproduction characteristic, i.e., detection ability of a random pattern including the 2T mark and the 2T space not longer than the resolution limit improves as compared to the optical information recording medium 2 of Comparative Example 1. Taking the foregoing bER practical use threshold 3E-4 into account, the optical information recording medium of Example 1 satisfies the condition of having a bER value not more than the threshold at a reproduction power not less than the predetermined reproduction power. Here, the predetermined reproduction power was 0.8 mW.

Why the bER becomes greater than the threshold with a reproduction power of less than the predetermined reproduction power, for example a reproduction power of 0.6 mW, is as described as follows. As already described, in order to carry out super-resolution reproduction of the optical information recording medium 1, there is the need to raise the temperature of the reproduction film 21 inside a reproduction beam spot. However, the bER in FIG. 6 exhibits a greater value than the threshold at a reproduction power of 0.6 mW, whereby demonstrating that not enough reproduction power for the super-resolution reproduction is inputted. Namely, it is considered that with the reproduction power of 0.6 mW, the reproduction power required for super-resolution of the optical information recording medium of Example 1 is not satisfied.

A 2T monotone pattern shown in FIG. 5 attains a CNR of around 5 dB with a reproduction power of 0.6 mW, and attains a CNR of not less than 10 dB with a reproduction power of 0.8 mW. Since it is obvious from the bER evaluation that a high quality super-resolution reproduction is attainable with the reproduction power of 0.8 mW, it is clear that a high quality super-resolution reproduction is attainable with the optical information recording medium 1 of Example 1 as long as the optical information recording medium 1 is reproduced with a reproduction power that is capable of attaining 10 dB of CNR of the 2T monotone pattern. On the other hand, Comparative Example 1 has a bER higher than the threshold for mostly all reproduction power values. Practically, there are a few reproduction power values in which the bER is locally below the threshold, however this is an extremely narrow range, and has hardly any reproduction power margin. As a result, it is obvious that it is difficult to make practical use of Comparative Example 1.

Thus, the above results of FIGS. 5 and 6 arrive at the following points.

First, with all of Example 1, Comparative Example 1, and Comparative Example 2, when a predetermined reproduction power is provided, the CNR of the 2T monotone pattern rises to 30 dB. This causes a signal quality of the 2T monotone pattern to increase, which 2T monotone pattern is not more than the resolution limit of the present evaluation optical system. However, in the bER evaluation of the random pattern, Comparative Example 2 was impossible to evaluate, and Comparative Example 1 was mainly equal to or more than the threshold 3E-4. Hence, Comparative Examples 1 and 2 are not suitable for practical use. On the other hand, just Example 1 satisfies the condition of having a bER of not more than the threshold 3E-4 with a reproduction power of not less than a predetermined reproduction power, and exhibits an improvement in signal quality of the random pattern including the 2T marks and 2T spaces that are not more than the resolution limit of the present evaluation optical system. The random pattern used for the bER evaluation in the present embodiment has a closer form of the optical information recording medium that can be practically used than the monotone pattern, and is made of pits and spaces of several types of mark lengths that are assumed to be practically usable. Namely, according to the arrangement of the optical information recording medium 1 of Example 1, a random pattern including a shortest mark and a shortest space, each of which are not longer than a resolution limit of the present evaluation optical system, can be made into practical use.

As already shown in Non Patent Literature 1, in a conventional example such as Super-RENS, an advanced signal processing from the PRML signal decoding method is required in carrying out the super-resolution reproduction of the random pattern. However, with an arrangement as like in Example 1, it is possible to carry out super-resolution of high reliability even by a PR(12221)ML decoding that is highly versatile and relatively cheap. Since it is possible to carry out super-resolution reproduction of high reliability even by a PR(12221)ML decoding that is highly versatile and relatively cheap, it is possible to carry out super-resolution reproduction with low electricity consumption, thereby allowing super-resolution reproduction to be made into practical use.

An optical information recording medium in which a film thickness of the reflective film 22 is 4 nm and an optical information recording medium in which a film thickness of the reflective film 22 is 15 nm were manufactured, by respectively modifying the film thickness of the reflective film 22 in Example 1 of 7 nm to 4 nm and also to 15 nm, so as to carry out the same evaluation as what was carried out to the optical information recoding medium of Example 1 to the two optical information recording mediums. As a result of the evaluation, a similar result to Example 1 was attained in the CNR and the bER values. That is to say, the film thickness of the reflective film 22 is not limited to 7 nm; the same super-resolution reproduction characteristic as Example 1 is attainable with a reflective film 22 in at least the range of not less than 4 nm to not more than 15 nm.

The present embodiment provides an example of an optical information recording medium 1 in which one layer of the information recording layer 20 is included. However, the arrangement is not limited to this, and as long as the cost and the recording capacity are well balanced, the optical information recording medium may include two or more layers of the information recording layer 20.

The present invention provides no limits in a recording method or a recording capacity. Therefore, the arrangement of the optical information recording medium 1 is applicable to various optical disks such as an optically-read disk for example a CD-ROM (Compact Disc Read Only Memory), a DVD-ROM (Digital Versatile Disc Read Only Memory), a BD-ROM (Blu-ray Disc Read Only Memory), and a HD DVD-ROM (High Definition Digital Versatile Disc Read Only Memory). Further, it is possible to apply the technique of the present application to write-once-read-many or rewritable optical information recording mediums such as a CD-R, a DVD-R, a BD-R, an HD DVD-R, a CD-RW, a DVD-RW, a BD-RE, an HD DVD-RW, a CD+RW, a DVD+RW, a DVD-RAM, and an HD DVD-RAM, by applying the reproduction film 21 and the reflective film 22 of the present embodiment. For example, a write-only-read-many or a rewritable recording film may be provided in addition to the reproduction film 21 and the reflective film 22, in order of the reproduction film 21, the reflective film 22, and the write-only-read-many or the rewritable recording film, from the direction from which light is incident. Moreover, the reproduction film 21 and the write-only-read-many or the rewritable recording film can be provided in this order from a side from which light is incident, and have the write-only-read-many or the rewritable recording film also function as the reflective film 22.

Figure 7:
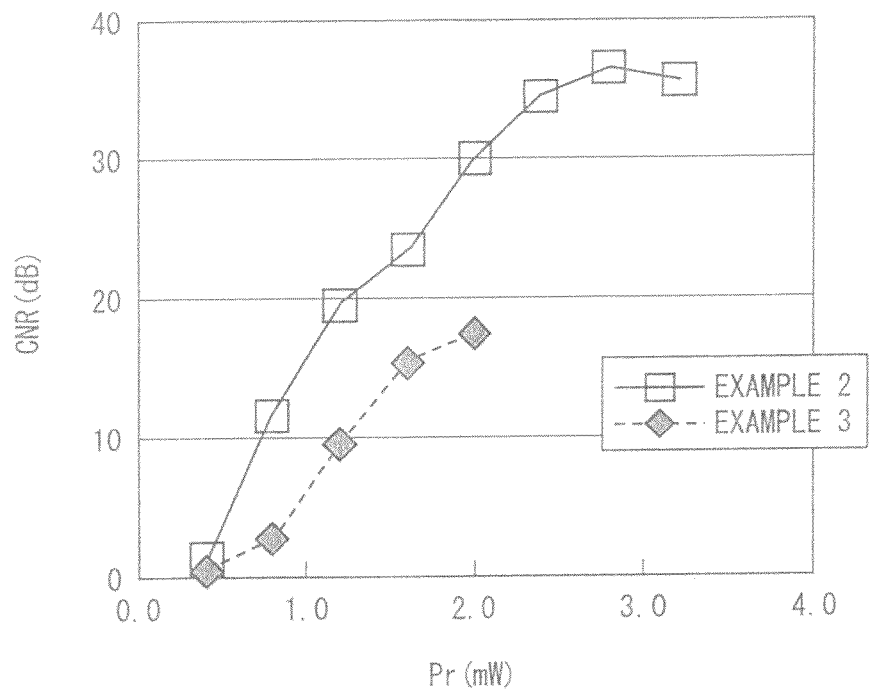
FIG. 7 is a characteristics diagram showing CNR reproduction power Pr dependencies of optical information recording mediums of Comparative Example 2 and Comparative Example 3.
Figure 8:
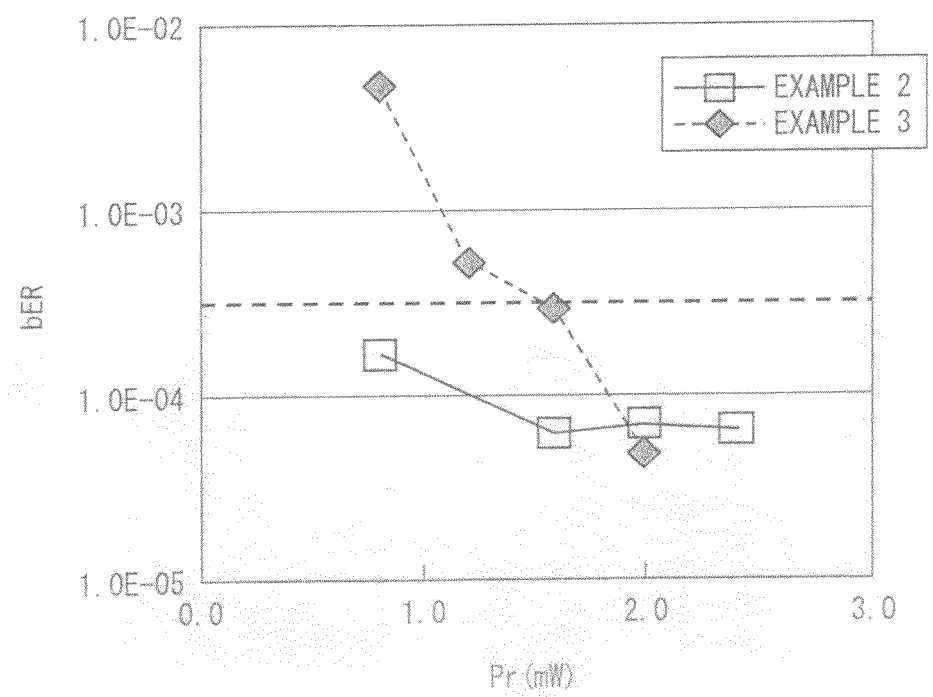
FIG. 8 is a characteristics diagram showing bER reproduction power Pr dependencies of optical information recording mediums of Comparative Example 2 and Comparative Example 3.

The following description explains, with reference to FIGS. 7 and 8, evaluations of various characteristics carried out to Examples other than Example 1 of the optical information recording medium 1 in the present embodiment. Below is an explanation of evaluations of various characteristics carried out to Examples 2 and 3 of the optical information recording medium 1 in the present embodiment. A film arrangement of the optical information recording medium of Examples 2 and 3 are identical to the film arrangement of the optical information recording medium 1 of Example 1. Except that the material used for the information recording layer 20 is different, how the optical information recording medium was manufactured and the method for forming the film are the same as what is explained in Example 1.

Example 2

First described is Example 2 of the optical information recording medium 1 of the present embodiment. The optical information recording medium 1 of Example 2 has an arrangement common to the optical information recording medium 1 of Example 1, except that titanium (Ti) is used instead of tantalum (Ta). In other words, the optical information recording medium 1 of Example 2 includes a reflective film 22 (film thickness: 7 nm) made of Ti, instead of the reflective film 22 (film thickness: 7 nm) made of Ta as in the optical information recording medium 1 of Example 1.

Example 3

Next described is Example 3 of the optical information recording medium 1 of the present embodiment. The optical information recording medium 1 of Example 3 has an arrangement common to the optical information recording medium 1 of Example 1, except that strontium titanate (SrTiO$_3$) is used instead of zinc oxide. In other words, the optical information recording medium 1 of Example 3 includes a reproduction film 21 (film thickness: 60 nm) made of SrTiO$_3$, instead of the reproduction film 21 (film thickness: 60 nm) made of zinc oxide as in the optical information recording medium 1 of Example 1.

With reference to FIGS. 7 and 8, the following description explains a result of a CNR, bER evaluation carried out to the optical information recording mediums of Examples 2 and 3. An evaluation as same as that carried out to the optical information recording medium of Example 1 was carried out to Examples 2 and 3. FIG. 7 is a characteristics diagram showing CNR reproduction power Pr dependencies of the optical information recording mediums of Examples 2 and 3. FIG. 8 is a characteristics diagram showing bER reproduction power Pr dependencies of the optical information recording mediums of Examples 2 and 3.

First described, with reference to FIG. 7, is a measurement result of the CNR reproduction power Pr dependencies of the optical information recording mediums of Examples 2 and 3 that have the 2T monotone patterns, measured by the disk measuring device.

As clear from the measurement result shown in FIG. 7, the CNR of the 2T monotone pattern increases as the reproduction power increases, for both the optical information recording mediums of Examples 2 and 3. More specifically, in Example 2, it was demonstrated that CNR is not less than 10 dB with a reproduction power of 0.8 mW, and the CNR further increases as the reproduction power increases, thereby attaining the CNR of not less than 30 dB, which 30 dB is a yardstick for practical use. Moreover, in Example 3, it was demonstrated that the CNR is not less than 10 dB with a reproduction power of 1.6 mW, and the CNR further increases as the reproduction power increases. This result exhibits that for both Examples 2 and 3, a signal amplitude of a 2T monotone pattern increases as the reproduction power increases, thereby causing improvement in signal quality.

With reference to FIG. 8, next described is a measurement result of bER reproduction power Pr dependencies of the optical information recording mediums of Examples 2 and 3 that have the random patterns, measured by the disk measuring device. A result that exhibited poor signal quality and resulted in insufficient measurement is not plotted in the characteristics diagram.

As clear in the measurement result shown in FIG. 8, the optical information recording medium 1 of Examples 2 and 3, at a reproduction power of not less than a predetermined reproduction power (0.8 mW for Example 2, and 1.6 mW for Example 3), exhibit a decrease in bER value. This improves a super-resolution reproduction characteristic, i.e., detection ability of the random pattern including the 2T marks and the 2T spaces of not more than the resolution limit. In view of the bER practical use threshold of 3E-4, the optical information recording medium of Examples 2 and 3 satisfy a condition of maintaining a bER value of not more than the threshold with a reproduction power not less than the predetermined reproduction power. Here, the predetermined reproduction power was 0.8 mW in Example 2 and 1.6 mW for Example 3. Why the bER is greater than the threshold in a reproduction power less than the predetermined reproduction power is as described follows, as similar to Example 1. As already described, in order to carry out super-resolution reproduction of the optical information recording medium 1, there is the need to raise the temperature of the reproduction film 21 inside the reproduction beam spot. However, the bER in FIG. 8 exhibits a greater value than the threshold at a reproduction power less than the predetermined reproduction power, whereby demonstrating that not enough reproduction power for the super-resolution reproduction is inputted. Namely, it is considered that the bER becomes greater than the threshold because the reproduction power of less than the predetermined reproduction power (less than 0.8 mW for Example 2, and less than 1.6 mW for Example 3) is not sufficient enough to carry out the super-resolution reproduction of the optical information recording medium 1 of Example 2 and the optical information recording medium 1 of Example 3.

A CNR of the 2T monotone pattern shown in FIG. 7 exhibits not less than 10 dB with the predetermined reproduction powers (0.8 mW for Example 2, and 1.6 mW for Example 3). Since it is obvious from the bER evaluation that a high quality super-resolution reproduction is attainable with the predetermined reproduction powers (0.8 mW for Example 2, and 1.6 mW for Example 3), it is clear that a high quality super-resolution reproduction is attainable by the optical information recording mediums 1 of Examples 2 and 3 when each of the optical information recording mediums 1 is reproduced with a reproduction power that can attain 10 dB of CNR of the 2T monotone pattern.

Thus, the above results of FIGS. 7 and 8 arrive at the following points.

In the bER evaluation of the random pattern, both Examples 2 and 3 satisfied the condition of having a reproduction power of not less than the predetermined reproduction powers (0.8 mW for Example 2, and 1.6 mW for Example 3) while the bER was maintained to not exceed the threshold 3E-4. As a result, the signal quality of the random pattern including the 2T marks and 2T spaces that are not more than the resolution limit of the present evaluation optical system, improved. As described before, the random pattern used for the bER evaluation in the present embodiment has an arrangement closer to the practical use of the optical information recording medium than the monotone pattern, and is made of pits and spaces having several mark lengths assumable for practical use. Namely, the arrangements of the optical information recording medium 1 of Example 2 and the optical information recording medium 1 of Example 3 also allow practical use of a random pattern including a shortest mark and a shortest space not more than the resolution limit of the present evaluation optical system.

The experimental results described above is a result measured by a disk measuring device which has a reproducing optical system constituted by (i) an objective lens having a numerical aperture of 0.85 and (ii) a reproducing light having a wavelength of 405 nm. That is to say, the result was obtained by carrying out reproduction using reproducing light having a wavelength of 405 nm via an objective lens having a numerical aperture of 0.85. However, the invention of the present application is not limited to the foregoing parameters. More specifically, it is confirmed that a similar result is attainable with an objective lens having a numerical aperture in a range of not less than 0.84 to not more than 0.86. It is also confirmed that a similar result is attainable with use of reproducing light that has a waveform in a range of not less than 400 nm to not more than 410 nm. Thus, the effect of the invention of the present application is sufficiently attainable in at least the foregoing range.

As already described, a desirable range of an average thickness of the light-transmitting layer is 93 μm to 108 μm in a case of a single-layered arrangement (arrangement including one layer of the information recording layer 20 in the optical information recording medium 1). For verification, an optical information recording medium in which an average thickness of the light-transmitting layer 10 is 93 μm and an optical recording information medium in which an average thickness of the light-transmitting layer 10 is 108 μm were produced as a modification of Example 1, so as to carry out an evaluation similar to what was carried out to the optical information recording medium of Example 1. As a result, a CNR and a bER result similar to Example 1 were attained. Note that the thickness of the light-transmitting layer 10 in the optical information recording mediums were in a range within ±3 μm of respective average thicknesses. A similar verification was carried out to Examples 2 and 3, and was demonstrated that the characteristics do not change. In other words, an average thickness of the light-transmitting layer 10 is not limited to 100 μm, and a super-resolution reproduction characteristic as similar to each of Examples are attained at least in a range of 93 μm to 108 μm. As described before, adjustment of the reproducing optical system allows a range of the average thickness of the light-transmitting layer 10 to be at least in a range of 69 μm to 108 μm.

As described above, the optical information recording medium 1 provides an information recording layer 20 which includes (i) a reflective film 22 that collects reproducing light and converts this light to heat and (ii) a reproduction film 21 that changes an optical constant of a part of the reproduction film 21 heated by the heat thus converted by the reflective film 22. Such an arrangement allows high quality super-resolution reproduction of random pattern in a highly versatile and relatively cheap decoding method, thereby improving information recording density.

Second Embodiment

Another embodiment of the present invention is described as follows, with reference to FIGS. 9 through 11. The arrangement other than what is described in the present embodiment is identical to that of First Embodiment. For convenience in explanation, members which have identical functions to members shown in the drawings of the foregoing First Embodiment are provided with the same reference signs, and descriptions of such members are omitted.

Figure 9:
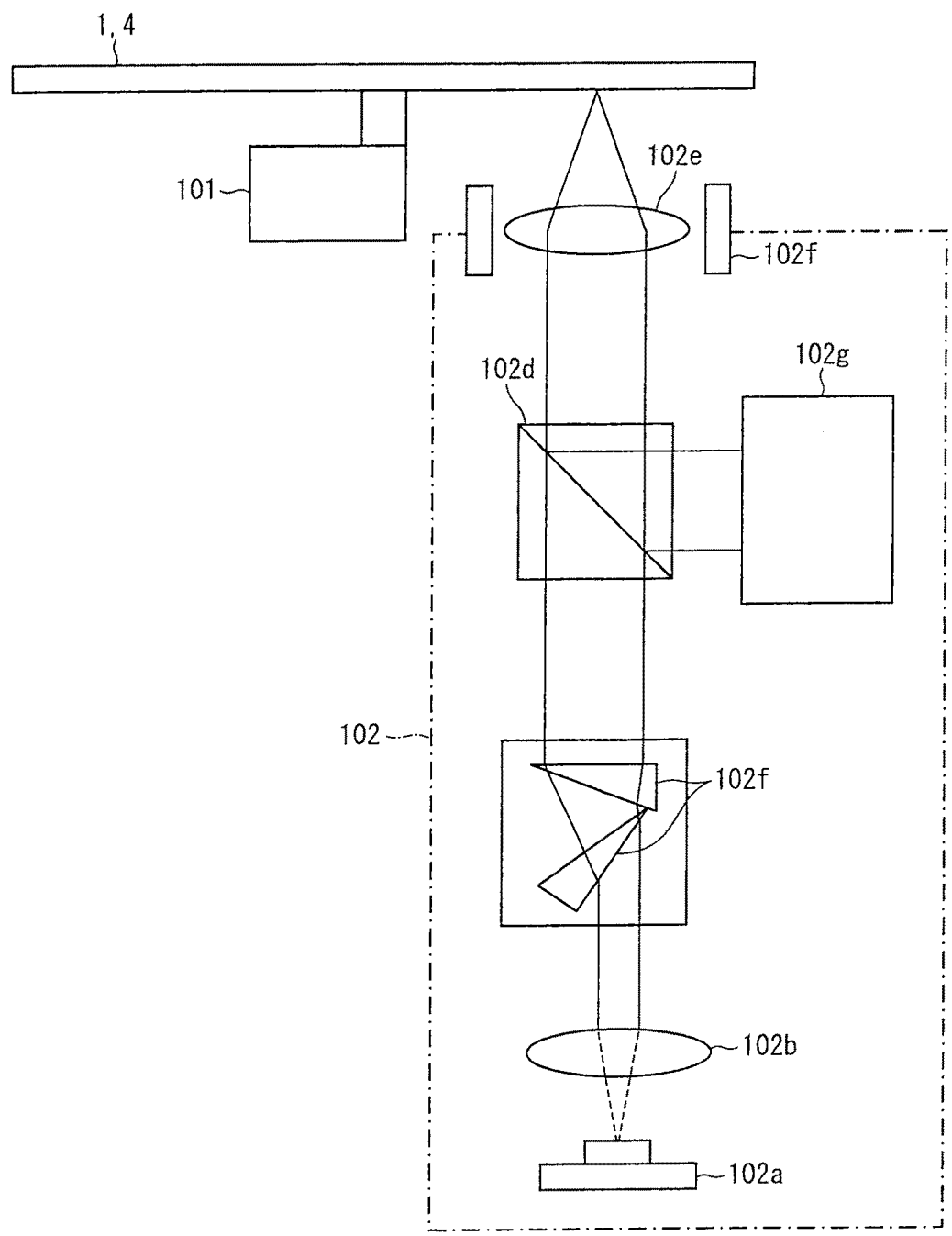
FIG. 9 is an explanatory view schematically illustrating one part of an arrangement of an optical information recording medium reproducing apparatus in accordance with the present invention.
Figure 10:
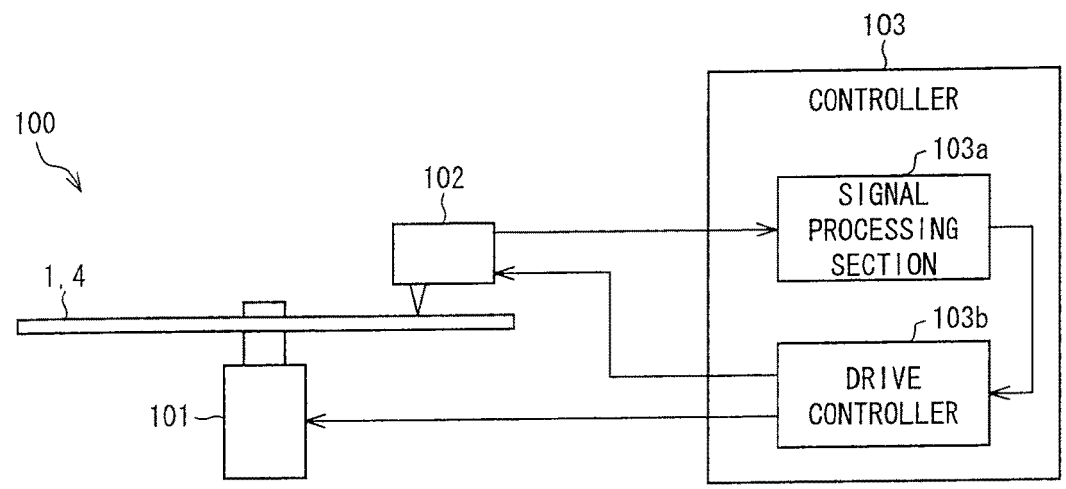
FIG. 10 is an explanatory view schematically illustrating one part of an arrangement of an optical information recording medium reproducing apparatus in accordance with the present invention.
Figure 11:
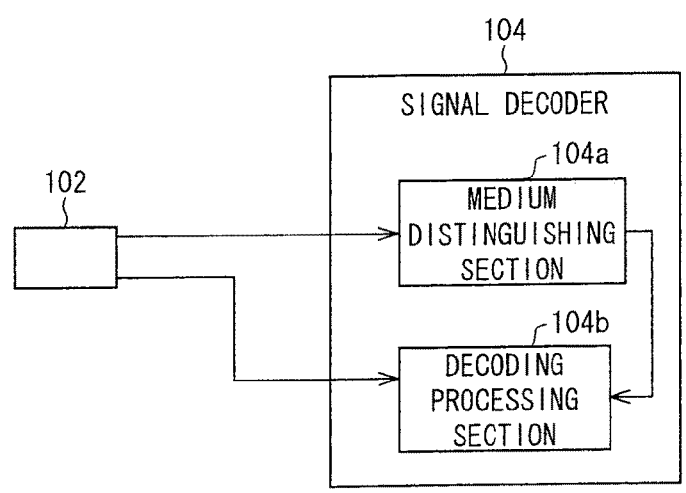
FIG. 11 is an explanatory view schematically illustrating one part of an arrangement of an optical information recording medium reproducing apparatus in accordance with the present invention.

First described, with reference to FIGS. 9 through 11, is an optical information recording medium reproducing apparatus (optical information processing apparatus) 100 for reproducing both the optical information recording medium (first optical information recording medium) 1 described in First Embodiment and a non-super-resolution optical information recording medium (second optical information recording medium) 4 with which a super-resolution reproduction is not carried out, which non-super-resolution optical information recording medium has a shortest mark length longer than a resolution limit of an optical system of the optical information recording medium reproducing apparatus 100. FIGS. 9 and 10 are explanatory views schematically illustrating a part of the optical information recording medium reproducing apparatus 100. A specific example of the non-super-resolution optical information recording medium 4 is a BD that has a single layer of 25 GB, which BD is already in practical use. In case where the BD already in practical use that has the single layer of 25 GB serves as the non-super-resolution optical information recording medium 4, the length of the shortest mark and the shortest space of the non-super-resolution information recording medium is 149 nm.

As illustrated in FIGS. 9 through 11, the optical information recording medium reproducing apparatus 100 includes: a spindle motor 101, a light pick-up device 102, a controller 103, and a signal decoder 104. The optical information recording medium reproducing apparatus 100 irradiates an optical beam (reproducing light) to the optical information recording medium 1 or the non-super-resolution optical information recording medium 4 and detects light thus reflected, so as to reproduce information recorded on the optical information recording medium 1 or the non-super-resolution optical information recording medium 4. In the present embodiment, a description is provided of a case where the optical information recording medium 1 and the non-super-resolution optical information recording medium 4 are of an orbicular optical disk. However, the optical information recording medium 1 and the non-super-resolution optical information recording medium 4 are not necessarily an orbicular optical disk.

First, the spindle motor 101 causes an optical spot to scan the optical information recording medium 1 or the non-super-resolution optical information recording medium 4 by rotationally driving the optical information recording medium 1 or the non-super-resolution optical information recording medium 4. The light-pickup device 102 reads out information from the optical information recording medium 1 or the non-super-resolution optical information recording medium 4. A specific description is later described for the light pick-up device 102.

The controller 103, as illustrated in FIG. 10, includes a signal processing section 103a, a drive controller 103b, and the like, and controls the light pick-up device 102 and the spindle motor 101. The signal processing section 103a reads out information recorded by use of recording marks on the optical information recording medium 1 or the non-super-resolution optical information recording medium 4 by detecting the recorded information based on an electric signal from the light pick-up device 102, which electric signal is obtained from light reflected from the recording marks on the optical information recording medium 1 or the non-super-resolution optical information recording medium 4. The signal processing section 103a generates a focus-error signal and a tracking-error signal (later described) based on the electric signal from the light pick-up device 102 obtained from light reflected from the recording marks on the optical information recording medium 1 or the non-super-resolution optical information recording medium 4. The drive controller 103b includes a servo circuit for controlling a drive of the spindle motor 101 and the light pick-up device 102 based on (i) the electric signal read out from the light pick-up device 102 and generated at the signal processing section 103a or (ii) instructions given externally. Particularly, the drive controller 103b includes a servo circuit for correcting a position of the objective lens 102e (later described) based on the focus error signal and tracking error signal from the signal processing section 103a and automatically focusing on and tracking laser light (reproducing light), as the foregoing servo circuit.

The following description explains a specific arrangement of the light pick-up device 102, with reference to FIG. 9. As illustrated in FIG. 9, the light pick-up device 102 includes a semiconductor laser 102a, a collimate lens 102b, a beam shaping prism (a prism which shapes the beam to a round shape) 102c, a beam splitter 102d, an objective lens 102e, a lens actuator 102f, and a detection optical system 102g. The light pick-up device 102 shapes laser light to a beam-form, which laser light is irradiated from the semiconductor laser 102a that is a light source, and converges the shaped laser light towards a surface of the optical information recording medium 1 or the non-super-resolution optical information recording medium 4.

Laser power of the semiconductor laser 102a can be set higher than a conventional laser power so as to cause a super-resolution characteristic to appear, but also can be switched to a conventional laser power. For example, a conventional BD standard sets the reproduction power of a single layer optical information recording medium as 0.3 mW, however in the case of Example 1 of First Embodiment, to carry out reproduction with high reliability, a higher reproduction laser power is required as compared to a conventional reproduction laser power, for example a reproduction laser power of not less than 0.8 mW. Therefore, the laser power of the semiconductor laser 102a is necessarily set higher than the conventional laser power. As already described in First Embodiment, for Examples 2 and 3 of First Embodiment, there is the need to reproduce an optical information recording medium 1 with a reproduction power (laser power) that attains a CNR of not less than 10 dB with a 2T monotone pattern which is a shortest mark of the optical information recording medium 1, for super-resolution reproduction in high quality. Thus, there is the need to set the laser power of the semiconductor laser 102a higher than a conventional laser power.

The present embodiment describes an arrangement which uses a semiconductor laser 102a as the laser light source. However, the laser light source is not limited to this, and other light sources are usable. Moreover, in the present embodiment, a light source having a wavelength which is equivalent to a violet color (375 nm to 491 nm) is to be used, and preferably, a light source having a wavelength of not less than 400 nm but not more than 410 nm is used. Further, an objective lens having a numerical aperture of not less than 0.84 but not more than 0.86 is used.

The following description explains an operation of the optical information recording medium reproducing apparatus 100 for obtaining, from the optical information recording medium 1 or the non-super-resolution optical information recording medium 4, a reproduction signal which has not been decoded yet. Here, as an example, an operation is explained of an optical information recording medium reproducing apparatus 100 for obtaining, from an optical information recording medium 1, a reproduction signal that has not been decoded yet.

First, laser light from the semiconductor laser 102a is converted to a substantially parallel light by the collimate lens 102b, and is further shaped by the beam shaping prism 102c in such a manner that a light intensity distribution is made substantially round. The substantially round parallel light is converged toward the optical information recording medium 1 as an optical beam (incident light) via the objective lens 102e, after the parallel light is transmitted through the beam splitter 102d. In the present embodiment, a numerical aperture (NA) of the objective lens 102e is set as 0.85.

A reflection light from the optical information recording medium 1 is split at the beam splitter 102d and is guided to the detection optical system 102g. Thereafter, the detection optical system 102g identifies (i) recorded information, (ii) focus point misalignment information, and (iii) track position misalignment information, based on (a) a change in polarized direction of the reflection light from the optical information recording medium 1, (b) a change in reflection light intensity (high and low of reflection light level), or (c) the like. Thereafter, the identified information is converted to an electric signal. The converted electric signal is transmitted to the controller 103 and the signal decoder 104. The reflection light includes light reflected from an address information mark constituted by a portion of the pre-pits 31 provided on the optical information recording medium 1. The detection optical system 102g detects a focus error signal and a tracking error signal with respect to the optional information recording medium 1. The focus error signal and the tracking error signal is of an optical shot (a part where the optical beam is converged) generated on an optical-beam-radiated surface of the optical information recording medium 1, which optical shot is formed from an electric signal obtained from light reflected from an address information mark, in other words an electric signal obtained by reproducing an address information mark.

The lens actuator 102f corrects a misalignment of the optical spot in a light axis direction by receiving feedback of the focus error signal. Thus, the light pick-up device 102 generates an optical spot on a desired information recording layer 20 in the optical information recording medium 1. Moreover, the lens actuator 102f corrects a misalignment in a track width direction of the optical spot, by receiving feedback of the tracking error signal. This allows the light pick-up device 102 to cause the optical spot to follow a target track in the optical information recording medium 1.

Here described is an operation of the optical information recording medium reproducing apparatus 100 for attaining, from the optical information recording medium 1, a reproduction signal that has not been decoded yet. An operation of the optical information recording medium reproducing apparatus 100 for attaining, from the non-super-resolution optical information recording medium 4, a reproduction signal that has not been decoded yet, is basically the same as that of the optical information recording medium 1.

The following description explains decoding of a signal in the present invention, with reference to FIG. 11. FIG. 11 is an explanatory view schematically illustrating the signal decoder 104 in accordance with the present embodiment. The signal decoder 104 includes a medium distinguishing section 104a and a decoding processing section 104b.

First described is decoding of a signal when the optical information recording medium 1 is reproduced. The decoding processing section 104b carries out a decoding process in accordance with a PR(12221)ML decoding method, based on a reproduction signal waveform of an electric signal transmitted from the light pick-up device 102.

Upon reproduction of the optical information recording medium 1, the medium distinguishing section 104a distinguishes a type of the medium that is currently reproduced, based on medium distinguishing information (distinguishing signal) provided in advance in the optical information recording medium 1 for distinguishing a type of optical information recording medium. Thereafter, an appropriate equating coefficient initial value information relevant to the medium is sent to the decoding processing section 104b. The decoding processing section 104b then equalizes (carries out LMS equalization to) a reproduction signal waveform in the data region by use of an equating coefficient, so as to carry out a decoding process in accordance with the PR(12221)ML decoding method (predetermined decoding method). Note that the equating coefficient thus used is one which can attain a smallest possible mean square error between an equalized waveform and a PR(12221) ideal waveform. Upon carrying out the LMS equalization, an equating coefficient initial value sent from the medium distinguishing section 104a is used as an initial value of the equating coefficient.

The following describes decoding of a signal upon reproduction of a non-super resolution optical information recording medium 4.

Upon reproduction of the non-super-resolution optical information recording medium, the medium distinguishing section 104a distinguishes a type of the medium that is currently reproduced, based on medium distinguishing information (distinguishing signal) provided in advance for distinguishing a type of optical information recording medium. Thereafter, an appropriate equating coefficient initial value information relevant to the medium is sent to the decoding processing section 104b. The decoding processing section 104b then LMS equalizes (carries out LMS equalization to) a reproduction signal waveform in the data region by use of an equating coefficient sent from the medium distinguishing section 104a, so as to carry out to the equalized waveform a decoding process in accordance with the PR(12221)ML decoding method (predetermined decoding method).

The decoding for the non-super-resolution optical information recording medium 4 differs from the optical information recording medium 1 in that the initial value of the equating coefficient used for the LMS equalization is different in value. This is because, with each of mediums, an respectively appropriate initial value of the equating coefficient is used, more specifically, an initial value of the equating coefficient that is respectively appropriate in accordance with recording density or super-resolution reproduction of the medium is used for the LMS equalization. In other words, equating coefficient initial value information that is sent to the decoding processing section 104b differs between the optical information recording medium 1 and the non-super-resolution optical information recording medium 4, due to the result of distinguishing in the medium distinguishing section 104a.

Furthermore, by respectively providing an equating coefficient initial value respectively suitable for the optical information recording medium 1 and the non-super-resolution optical information recording medium 4, the following advantages are attainable.

First, with the PR(12221)ML decoding method, there is a need to optimize the equating coefficient in order to attain a high quality signal. Generally, the equating coefficient is optimized by the LMS. The method for optimizing the equating coefficient can be a method which updates the equating coefficient in real time in accordance with reproduction circumstances (real time updating method), or a method in which the equivalent equating coefficient is optimized in advance by carrying out a test read (test read optimization). An optimum equating coefficient varies depending on density of the optical information recording medium or the super-resolution reproduction. Therefore, the following two advantages are attainable by respectively setting, in advance, the equating coefficient initial value in the LMS equalization to a suitable value for the optical information recording medium 1 and the non-super-resolution optical information recording medium 4.

The first merit is that the number of bits or the amount of time required for the equating coefficient to converge to an optimum amount can be decreased. This makes it possible to attain a high quality decoding more easily. With the real time updating method, an actual reproduction condition, for example a tilt of the medium and an influence caused by disturbance, can be followed by a short number of bits or time. This allows attainment of high quality decoding. Further, with the test read optimization, the number of bits or the amount of time required for optimization of the equating coefficient can be shortened. This also allows attainment of high quality decoding.

The second merit is that the equating coefficient becomes converted to the optimum value. If the equating coefficient initial value differs largely from an optimum value of the equating coefficient, the optimization of the equating coefficient does not carry out well, and may cause a case where the equating coefficient does not converge to an optimum value, or cause a case where the value is converged to a different value from the optimum value even if the equating coefficient is converged. As a result, a high quality decoding of a random pattern cannot be carried out. However, by setting the equating coefficient initial value to appropriate values for the optical information recording medium 1 and the non-super-resolution optical information recording medium 4, respectively, it is possible to reduce the difference between the equating coefficient initial value and the equating coefficient optimum value, thereby allowing the equating coefficient to converge to an optimum value.

In a phenomenon in which the equating coefficient does not converge to an optimum value due to difficulty in optimization thereof, or in which the equating coefficient converges to a different value from the optimum value, an effect caused to the reproduction characteristics by a difference between the equating coefficient initial value and the optimum value of the equating coefficient is small, in case of an optical information recording medium reproducing apparatus which is compatible to just an optical information recording medium that has a shortest mark and a shortest space longer than a reproduction resolution limit of the optical system, as like the conventional optical information recording medium reproducing apparatus which has a reproduction compatibility with an optical information recording medium with different recording capacity and recording density. However, the optical information recording medium 1 in the present embodiment has a recording density close to two fold of the recording density of the non-super-resolution optical information recording medium 4. Further, since super-resolution reproduction is carried out, the effect given to the reproduction characteristics by the difference between the equating coefficient initial value and the optimum value of the equating coefficient is relatively large. Therefore, as described in the present embodiment, with an optical information recording medium reproducing apparatus that reproduces the optical information recording medium 1, there is the need to set an equating coefficient initial value in accordance with a recording density or the super-resolution reproduction.

On the other hand, the optical information recording medium reproducing apparatus 100, as described above, carries out a decoding process based on an equating coefficient initial value that is specifically suitable for the optical information recording medium according to recording density of the optical information recording medium to be reproduced or a super-resolution reproduction. This allows carrying out high quality decoding process, and allows reproduction with high reliability. As a result, it is possible to reproduce various optical information recording mediums that have various recording densities, each in a highly reliable manner.

The optical information recording medium reproducing apparatus 100 described above has a reproducing optical system consisted by (i) an objective lens having a numerical aperture of 0.85 and (ii) reproducing light having a wavelength of 405 nm. The present invention, however, is not limited to these parameters. More specifically, it is confirmed that a similar result is attained by use of an objective lens having a numerical aperture in a range of not less than 0.84 to not more than 0.86. It is also confirmed that a similar result is attained by use of a reproducing light having a wavelength in a range of not less than 400 nm to not more than 410 nm. Therefore, the effect of the invention of the present application is sufficiently attained in at least the foregoing ranges.

The present embodiment describes an arrangement in which a distinguishing signal is provided in the optical information recording medium 1 and also the non-super-resolution optical information recording medium 4. However, this is just for easy understanding, and the arrangement is not necessarily limited to this. For example, the distinguishing signal can be provided to just one of the optical information recording medium 1 and the non-super-resolution optical information recording medium 4. The same object is attainable with the arrangement providing the distinguishing signal to just one of the optical information recording medium 1 and the non-super-resolution optical information recording medium 4 as with the arrangement providing the distinguishing signal to both the optical information recording medium 1 and the non-super-resolution optical information recording medium 4, by distinguishing whether the optical information recording medium is the optical information recording medium 1 or the non-super-resolution optical information recording medium 4 based on whether the optical information recording medium has the distinguishing signal.

Moreover, in the present embodiment, the optical information recording medium 1 and the non-super-resolution optical information recording medium 4 are described as separate optical information recording mediums. However, the two optical information recording mediums can actually be an integrated optical information recording medium. For example, the optical information recording medium can be (i) an integrated optical information recording medium (double-sided integrated optical information recording medium) in which one of its sides is the optical information recording medium 1 and the other one of its sides is the non-super-resolution optical information recording medium 4, or (ii) an integrated optical information recording medium (one-sided integrated optical information recording medium) in which two or more of the information recording layers are provided on one side of the medium, and at least one of the layers is substantially equivalent to the optical information recording medium 1, and the remaining at least one of the layers is substantially equivalent to the non-super-resolution optical information recording medium 4. Moreover, the double-sided integrated optical information recording medium and the single-sided integrated optical information recording medium can be configured by combining a super-resolution medium and a non-super-resolution medium, each of which are reproduced by use of the same reproducing optical system, or can be configured by combining a super-resolution medium and a non-super-resolution medium, each of which are reproduced by reproducing optical systems of a different standard.

Third Embodiment

One embodiment of the present invention is described as follows, with respect to FIG. 12. The arrangements other than what is described in the present embodiment are identical to that of First and Second Embodiments. Moreover, for convenience in explanation, members which have identical functions as the members illustrated in the drawings of First and Second Embodiments are provided with the same reference signs, and their descriptions are omitted.

The film thickness of the reproduction film 21 and the reflective film 22 in the optical information recording medium 1 according to First Embodiment is optimized so that a bER (Bit Error Rate) characteristic is ideal under a measurement condition of First Embodiment. The present embodiment discloses an appropriate thickness range of the reproduction film 21. Other arrangements and conditions of the optical information recording medium are common to First Embodiment, unless mentioned otherwise.

In First Embodiment, the reproduction film 21 of the optical information recording medium 1 was made of zinc oxide having a film thickness of 60 nm. In the following description, various characteristics of the optical information recording medium 1 are compared, in cases where a film thickness of the reproduction film 21 is varied.

Example 4

First described is Example 4 of an optical information recording medium 1 of the present embodiment. The optical information recording medium 1 of Example 4 has an arrangement common to that of the optical information recording medium 1 of Example 1, except that the reproduction film 21 made of zinc oxide is provided so as to have a film thickness of 55 nm. That is to say, the optical information recording medium 1 of Example 4 includes a reproduction film 21 (film thickness: 55 nm), instead of the reproduction film 21 (film thickness: 60 nm) made of zinc oxide as in the optical information recording medium 1 of Example 1.

Example 5

Next described is Example 5 of the optical information recording medium 1 in the present embodiment. The optical information recording medium 1 of Example 5 has an arrangement common to that of the optical information recording medium 1 of Example 1, except that the reproduction film 21 made of zinc oxide is provided so as to have a film thickness of 65 nm. That is to say, the optical information recording medium 1 of Example 5 includes a reproduction film 21 (film thickness: 65 nm) instead of the reproduction film 21 (film thickness: 60 nm) made of zinc oxide as in the optical information recording medium 1 of Example 1.

Comparative Example 3

Next described is Comparative Example 3, so as to compare with Examples 4 and 5. An optical information recording medium 1 of Comparative Example 3 has an arrangement common to that of the optical information recording medium 1 of Example 1, except that the reproduction film made of zinc oxide is provided so as to have a film thickness of 78 nm. In other words, the optical information recording medium 1 of Comparative Example 3 includes a reproduction film 21 (film thickness: 78 nm) instead of the reproduction film 21 (film thickness: 60 nm) made of zinc oxide as in the optical information recording medium 1 of Example 1.

Figure 12:
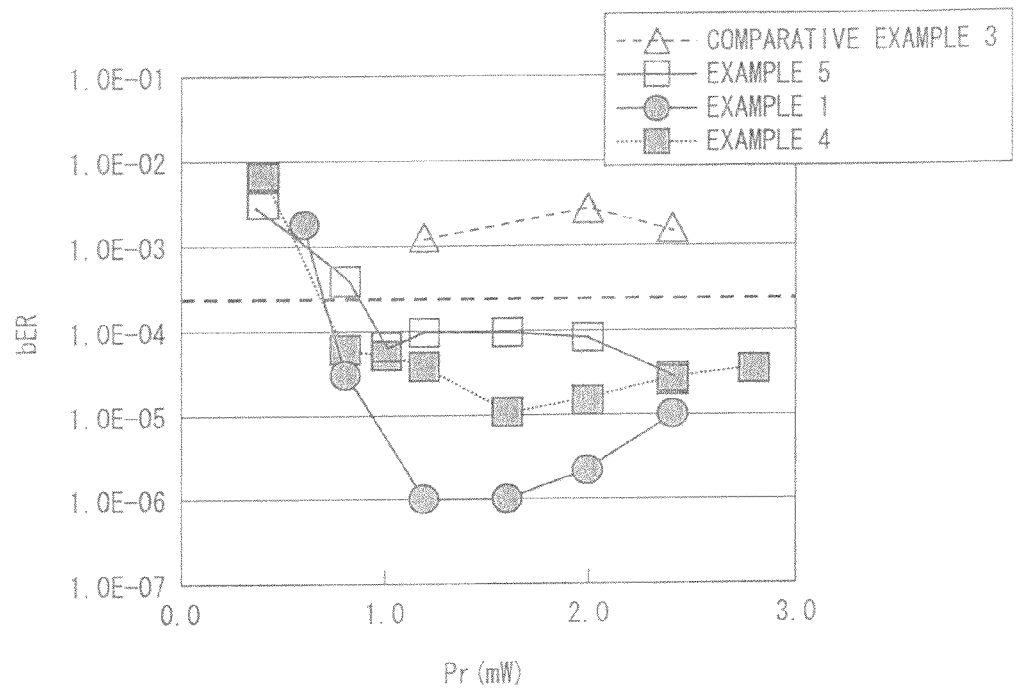
FIG. 12 is a characteristics diagram showing bER reproduction power Pr dependencies of optical information recording mediums of Example 1, Example 4, Example 5, and Comparative Example 3.

The following description explains, with reference to FIG. 12, a comparison result of a super-resolution reproduction characteristic of a random pattern as similar to First Embodiment, for Examples 4 and 5 and Comparative Example 3.

FIG. 12 is a characteristics diagram showing bER reproduction power Pr dependencies of each of optical information recording mediums of Examples 1, 4, and 5, and Comparative Example 3, respectively. For comparison with First Embodiment, the result of Example 1 is shown together in FIG. 12.

The following description explains a measurement result of the bER reproduction power Pr dependencies for the optical information recording mediums of Examples 4 and 5, and Comparative Example 3.

As clear from the measurement result shown in FIG. 12, when the optical information recording medium 1 of Example 4 and the optical information recording medium 1 of Example 5 have not less than a predetermined reproduction power (0.8 mW for Example 4, and 1.0 mW for Example 5), the bER value decreases with respect to the respective reproduction power. This causes a super-resolution reproduction characteristic, i.e. a detection ability, of a random pattern that includes 2T marks and 2T spaces not more than a resolution limit to improve. In view of the aforementioned bER practical use threshold 3E-4, the optical information recording mediums of Examples 4 and 5 satisfy the condition of having not less than the predetermined reproduction power while maintaining a bER value of not more than the threshold 3E-4. It is considered that, the reason why the bER is greater than the threshold 3E-4 when the reproduction power is less than the predetermined power is that the reproduction power is not sufficient enough for carrying out super-resolution reproduction of the optical information recording medium 1 of the Examples, as similar to First Embodiment.

Note that although the CNR reproduction power Pr dependencies of a 2T monotone pattern for the Examples 4 and 5 and Comparative Example 3 are not shown in the present embodiment, it was confirmed that with Examples 4 and 5, the 2T monotone pattern attains a CNR of not less than 10 dB at a predetermined reproduction power of each of the Examples.

Thus, the above results of FIG. 12 arrive at the following points.

When reproduction was carried out with a reproduction power of not less than a power that is capable of attaining a 2T monotone pattern CNR of 10 dB, the optical information recording mediums 1 of Examples 1, 4, and 5 (including a reproduction film 21 made of zinc oxide having a film thickness of not less than 55 nm to not more than 65 nm) were capable of carrying out high quality super-resolution reproduction. On the other hand, Comparative Example 3 (film thickness of 78 nm) had a bER greater than the practical use threshold 3E-4 for all reproduction power values, and resulted to have a poor super-resolution reproduction characteristic.

Therefore, it is obvious that it is difficult to practically use Comparative Example 3. In other words, the present embodiment demonstrates that when the reflective film 22 made of tantalum (Ta) has a film thickness of 7 nm, a good super-resolution reproduction characteristic is attained by having a reproduction film 21 made of zinc oxide in a range of not less than 55 nm to not more than 65 nm.

Optimum values of bER are shown in FIG. 12 as 1E-6 for Example 1, and 1E-5 for Examples 4 and 5, which has a one-digit difference. However, a difference in absolute value in the range of 1E-6 to 1E-5 is fundamentally not a significant difference. This is because, in the disk measurement used for bER calculation of the present application, a data modulus is approximately 1 million, i.e. 1E6, and a bER of 1E-6 denotes an order of one error, and similarly 1E-5 denotes an order of ten errors. Therefore, the value may possibly vary within this range due to (i) individual difference between the optical information recording mediums, (ii) any defect on the disk at the time of manufacturing the optical information recording medium, (iii) difference in a measured region (for example, track position), or (iv) the like. Thus, such a difference cannot be said as a fundamental significant difference. In practical use of the medium, error correction is carried out; therefore the difference in this range further loses significant meaning. That is to say, a bER value not more than the practical use threshold of 3E-4 allows practical use of the optical information recording medium. This applies to all other Embodiments.

Fourth Embodiment

One embodiment of the present invention is described as below with reference to FIG. 13. Any arrangements other than what is described in the present embodiment are identical to that of First to Third Embodiments. Moreover, for convenience in explanation, each of members that have identical functions as the members illustrated in the drawings of First to Third Embodiments is provided with an identical reference sign, and the explanation thereof is omitted.

The reproduction film 21 and the reflective film 22 of the optical information recording medium 1 in First Embodiment have their film thicknesses optimized so that a best bER (Bit Error Rate) characteristic is attained under the measurement condition of First Embodiment. The present embodiment discloses an appropriate film thickness range of the reflective film 22, and the arrangement and conditions of the optical information recording medium is common to First Embodiment unless mentioned otherwise.

In First Embodiment, the reflective film 22 of the optical information recording medium 1 is made of tantalum (Ta) having a film thickness of 7 nm. The following description compares various characteristics of the optical information recording medium 1 in a case where the film thickness of the reflective film 22 is varied.

Example 6

First described is Example 6 of the optical information recording medium 1 in the present embodiment. The optical information recording medium 1 in Example 6 has an arrangement common to that of the optical information recording medium 1 of Example 1 except that the reflective film 22 made of tantalum (Ta) is provided so as to have a film thickness of 4 nm. That is to say, the optical information recording medium 1 of Example 6 has a reflective film 22 (film thickness: 4 nm), instead of the reflective film 22 (film thickness: 7 nm) made of tantalum (Ta) as in the optical information recording medium 1 of Example 1.

Example 7

Next described is Example 7 of the optical information recording medium 1 in the present embodiment. The optical information recording medium 1 in Example 7 has an arrangement common to that of the optical information recording medium 1 of Example 1, except that the reflective film 22 made of tantalum (Ta) is provided so as to have a film thickness of 15 nm. That is to say, the optical information recording medium 1 of Example 7 has a reflective film 22 (film thickness: 15 nm), instead of the reflective film 22 (film thickness: 7 nm) made of tantalum (Ta) as in the optical information recording medium 1 of Example 1.

Comparative Example 4

Next described is Comparative Example 4, so as to compare with Examples 6 and 7. The optical information recording medium 1 in Comparative Example 4 has an arrangement common to that of the optical information recording medium 1 of Example 1, except that the reflective film 22 made of tantalum (Ta) is provided so as to have a film thickness of 30 nm. That is to say, the optical information recording medium 1 of Comparative Example 4 has a reflective film 22 (film thickness: 30 nm), instead of the reflective film 22 (film thickness: 7 nm) made of tantalum (Ta) as in the optical information recording medium 1 of Example 1.

Comparative Example 5

Next described is Comparative Example 5, so as to compare with Examples 6 and 7, similarly to Comparative Example 4. The optical information recording medium 1 of Comparative Example 5 has an arrangement common to that of the optical information recording medium 1 of Example 1, except that the reflective film 22 made of tantalum (Ta) is provided so as to have a film thickness of 50 nm. That is to say, the optical information recording medium 1 of Comparative Example 5 has a reflective film 22 (film thickness: 50 nm), instead of the reflective film 22 (film thickness: 7 nm) made of tantalum (Ta) as in the optical information recording medium 1 of Example 1.

Figure 13:
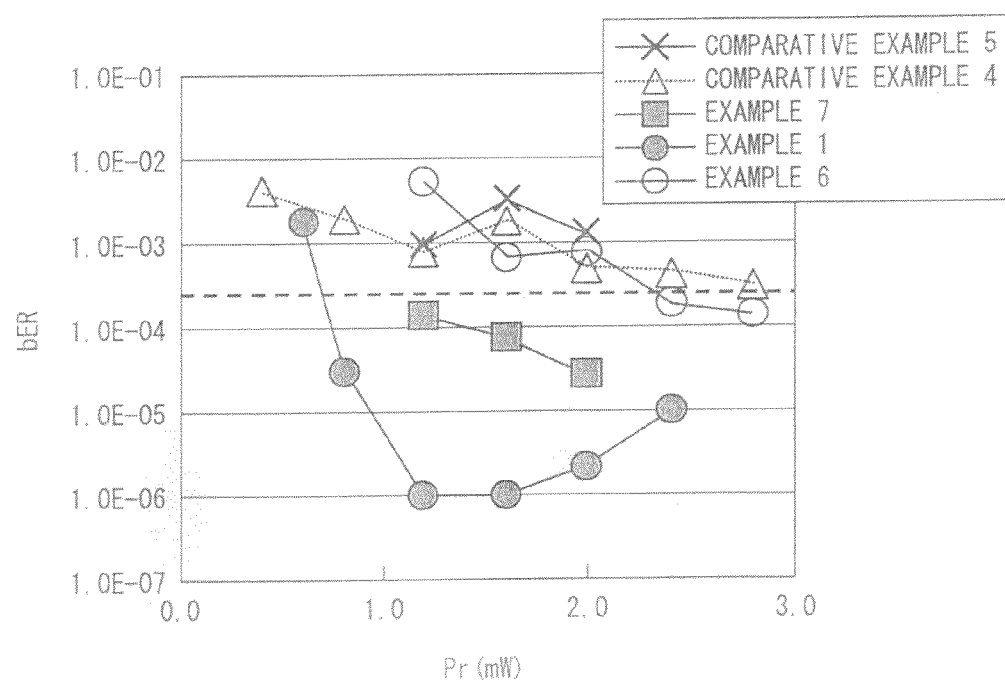
FIG. 13 is a characteristics diagram showing bER reproduction power Pr dependencies of optical information recording mediums of Example 1, Example 6, Example 7, Comparative Example 4 and Comparative Example 5.

The following description explains, with reference to FIG. 13, a result of comparing a super-resolution reproduction characteristic of a random pattern as similar to First Embodiment, for Examples 6 and 7, and Comparative Examples 4 and 5. FIG. 13 is a characteristic diagram showing bER reproduction power Pr dependencies of each of the optical information recording medium of Examples 1, 6, and 7, and Comparative Examples 4 and 5, respectively. For comparison with First Embodiment, the result of Example 1 is shown together in FIG. 13.

The following description explains a measurement result of bER reproduction power Pr dependencies of the optical information recording mediums of Examples 6 and 7, and Comparative Examples 4 and 5, respectively.

As clear from the measurement result shown in FIG. 13, when the optical information recording medium 1 of Example 6 and the optical information recording medium 1 of 7 have not less than a predetermined reproduction power (2.4 mW for Example 6, 1.2 mW for Example 7), the bER value decreases with respect to the respective reproduction power. This causes a super-resolution reproduction characteristic, i.e. detection ability, of a random pattern that includes a 2T mark and a 2T space not more than a resolution limit to improve. In view of the aforementioned bER practical use threshold 3E-4, the optical information recording mediums of Examples 6 and 7 satisfy the condition of having a reproduction power not less than the predetermined reproduction power while maintaining the bER value as not more than the threshold 3E-4. It is considered that, the reason why the bER is greater than the threshold 3E-4 or the bER cannot be measured when the reproduction power is less than the predetermined power is that the reproduction power is not sufficient enough for carrying out super-resolution reproduction of the optical information recording medium 1 of the Examples, as similar to First Embodiment.

Note that although the CNR reproduction power Pr dependencies of a 2T monotone pattern of the Examples 6 and 7 and Comparative Examples 4 and 5 are not shown in the present embodiment, it was confirmed that with Examples 6 and 7, the 2T monotone pattern attains a CNR of not less than 10 dB at a predetermined reproduction power of each of the Examples.

Thus, the above results of FIG. 13 arrive at the following points.

When reproduction is carried out with a reproduction power not less than a power that is capable of attaining a 2T monotone pattern CNR of 10 dB, the optical information recording mediums 1 of Examples 1, 6, and 7 (that includes a reflective film 22 made of tantalum having a film thickness of not less than 4 nm to not more than 15 nm) were capable of carrying out high quality super-resolution reproduction. On the other hand, Comparative Example 4 (film thickness of 30 nm) and Comparative Example 5 (film thickness of 50 nm) had a bER greater than the practical use threshold 3E-4 for all reproduction power values, and resulted to have a poor super-resolution reproduction characteristic.

Therefore, it is obvious that it is difficult to practically use Comparative Examples 4 and 5. Also, although not illustrated in FIG. 13, the bER value was greater than the practical use threshold 3E-4 for all reproduction power values, even with a reflection film 22 having a film thickness of less than 4 nm. In other words, it was demonstrated in the present embodiment that when the reproduction film 21 made of zinc oxide has a film thickness of 60 nm, a good super-resolution reproduction characteristic is attained by having a reflective film 22 made of tantalum (Ta) in a range of not less than 4 nm to not more than 15 nm.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

As described above, the optical information recording medium of the present invention is preferably arranged in such a manner that the reproducing light has a reproduction power that attains a carrier-to-noise ratio of not less than 10 dB from a consecutive pattern which alternates between the 2T mark and the 2T space.

Thus, it is possible to decode and reproduce a random pattern modulated to high density by RLL(1,7) modulation, in high quality by use of reproduction power having a carrier-to-noise ratio of not less than 10 dB, in a relatively cheap PR(12221)ML decoding method, which modulated random pattern includes 2T marks and 2T spaces that are not more than a resolution limit of a reproducing optical system.

In addition to the above arrangement, the optical information recording medium of the present invention is preferably arranged in such a manner that the reproduction film is made of zinc oxide and has a film thickness of not less than 55 nm but not more than 65 nm.

In addition to the above arrangement, the optical information recording medium of the present invention is preferably arranged in such a manner that the reflective film is made of tantalum and has a film thickness of not less than 4 nm but not more than 15 nm.

With the above arrangement, it is possible to cause a decrease in bER value when a reproduction power is not less than a predetermined value. This improves super-resolution reproduction characteristics, i.e., detection ability, of a random pattern including the 2T marks and 2T spaces not longer than a resolution limit.

In addition to the above arrangement, an optical information processing apparatus of the present invention is preferably an optical information processing apparatus for decoding, by a predetermined decoding method, first information recorded on a first optical information recording medium as disclosed herein or second information recorded on a second optical information recording medium so as to reproduce the first information or the second information respectively, the second optical information recording medium having a shortest mark length and a shortest space length which are longer than a resolution limit of a reproducing optical system, a first initial value of an equalizer coefficient for decoding the first information recorded on the first optical information recording medium and a second initial value of an equalizer coefficient for decoding the second information recorded on the second optical information recording medium being set in advance so as to be different from each other.

According to the invention, by setting in advance a recording density of an optical information recording medium to be reproduced, i.e., each of the first optical information recording medium and the second optical information recording medium, or by setting in advance an equivalent coefficient initial value suitable for super-resolution reproduction, the number of bits or a length of time for optimizing an equivalent coefficient of the first optical information recording medium and the second optical information recording medium can be reduced, and also the equivalent coefficient can be securely converged to its optimum value. Hence, it is possible to decode and reproduce in high quality, in accordance with the optical information recording medium to be reproduced.

In addition to the above arrangement, the optical information recording medium of the present invention is preferably arranged in such a manner that, a distinguishing signal, for distinguishing between the first optical information recording medium and the second optical information recording medium, is recorded on the first optical information recording medium or the second optical information recording medium, and the optical information processing apparatus (i) distinguishes, based on the distinguishing signal, whether the first optical information recording medium or the second optical information recording medium should be reproduced, (ii) selects, based on a distinguished result, the first initial value or the second initial value set in advance so as to decode the first optical information recording medium or the second optical information recording medium, and (iii) reproduces the first information or the second information recorded in the first optical information recording medium or the second optical information recording medium, respectively.

Thus, it is possible to (i) distinguish based on the distinguishing signal whether the optical information recording medium to be reproduced is the first optical information recording medium or the second information recording medium, and (ii) decode with use of an equivalent coefficient initial value suitable for a recording density of the optical information recording medium to be reproduced or for super-resolution reproduction, in accordance with the distinguishing result. Hence, it is possible to reduce the number of bits or a length of time for optimizing an equivalent coefficient of the first optical information recording medium and the second optical information recording medium, and also securely converge the equivalent coefficient to the optimum value. Hence, it is possible to decode and reproduce in high quality, in accordance with the optical information recording medium to be reproduced.

In addition to the above arrangement, an optical information processing apparatus of the present invention is preferably an optical information processing apparatus for reproducing information from the foregoing optical information recording medium, in which the information is reproduced by irradiating the optical information recording medium with the reproducing light having a reproduction power that attains a carrier-to-noise ratio of not less than 10 dB from a consecutive pattern which alternates between the shortest mark and the shortest space.

The inventors found, for the first time, that with an information recording layer formed on a substrate that has a reproduction film (made of (i) zinc oxide, (ii) strontium titanate, (iii) titanium oxide, (iv) cerium oxide, or a material including at least one of the (i) through (iv)) and a reflective film (made of tantalum or titanium) provided in this order from a side from which reproducing light is incident, super-resolution reproduction with which a better bER value is attained can be carried out to recorded information (random pattern) formed in accordance with a predetermined modulation as marks and spaces that have a plurality of lengths, by irradiating reproducing light in such a manner that information is reproduced, which reproducing light has reproduction power having a carrier-to-noise ratio of not less than 10 dB. The carrier-to-noise ratio is attained from a consecutive pattern of a shortest mark and a shortest space (see FIGS. 5, 6, 7, and 8).

According to the invention, reproduction can be carried out by use of reproducing light sufficient for carrying out super-resolution reproduction with which a better bER value is attained. Thus, by use of a relatively cheap decoding method, it is possible to decode and reproduce in high quality a random pattern modulated to high density by a predetermined modulation, which random pattern includes a shortest mark and a shortest space of not more than a resolution limit of the reproducing optical system.

In addition to the foregoing arrangement, the optical information processing apparatus of the present invention is preferably an optical information processing apparatus for reproducing information from the foregoing optical information recording medium, in which the information is reproduced by irradiating the optical information recording medium with the reproducing light having a reproduction power that attains a carrier-to-noise ratio of not less than 10 dB from a consecutive pattern which alternates between the 2T mark and the 2T space.

The inventors found, for the first time, that with an information recording layer formed on a substrate that has a reproduction film (made of (i) zinc oxide, (ii) strontium titanate, (iii) titanium oxide, (iv) cerium oxide, or (v) a material including at least one of the (i) through (iv)) and a reflective film (made of tantalum or titanium) provided in this order from a side from which reproducing light is incident, super-resolution reproduction with which a better bER value is attained can be carried out by irradiating reproducing light in such a manner that information is reproduced, which reproducing light has reproduction power having a carrier-to-noise ratio of not less than 10 dB. The carrier-to-noise ratio is attained from a consecutive pattern of a 2T mark and a 2T space with respect to recorded information (random pattern) formed in accordance with a predetermined modulation as marks and spaces having a plurality of lengths (see FIGS. 5, 6, 7, and 8).

According to the invention, reproduction can be carried out by use of reproducing light sufficient for carrying out super-resolution reproduction with which a better bER value is attained. Thus, by use of a relatively cheap decoding method, it is possible to decode and reproduce in high quality a random pattern modulated to high density by a predetermined modulation, which random pattern includes a 2T mark and a 2T space shorter than 0.12 μm, which length is not more than a resolution limit of the reproducing optical system.

INDUSTRIAL APPLICABILITY

As described above, with an optical information recording medium and an optical information processing apparatus of the present invention, it is possible to carry out super-resolution reproduction with which a better bER value is attained, by a highly versatile signal decoding method, when information is recorded in a random pattern that includes a mark length of not more than a resolution limit. Hence, the present invention is suitably used in industrial fields related to an optical information recording medium for super-resolution reproduction, and an optical information processing apparatus for reproducing the optical information recording medium.

The invention claimed is:

1. A reproducing apparatus for reproducing an optical information recording medium, the reproducing apparatus irradiating, with reproducing light, an optical information recording medium including an information recording layer on which information is recorded as marks and spaces coded by RLL(1,7) modulation, each of the marks and spaces having one of a plurality of lengths, and 2T marks and 2T spaces of the marks and spaces being formed to be shorter than 0.12 µm, and reproducing a reproduction signal waveform obtained by the irradiation, said reproducing apparatus comprising:
a means for irradiating said optical information recording medium with said reproducing light, having a power not less than 0.8 mW and having a wavelength of not less than 400 nm but not more than 410 nm, via an objective lens having a numerical aperture of not less than 0.84 but not more than 0.86;
a means for real time updating, upon actual reproduction of the data region, a coefficient for attaining a waveform close to a target waveform in PRML decoding; and
a means for generating a clock by use of a reproduction signal and decoding the obtained reproduction signal waveform in accordance with a PR(12221)ML decoding method.

* * * * *